(12) United States Patent
Shiino et al.

(10) Patent No.: US 7,663,273 B2
(45) Date of Patent: Feb. 16, 2010

(54) MOTOR CONTROL APPARATUS, POWER STEERING APPARATUS AND BRAKE CONTROL APPARATUS

(75) Inventors: Kohtaro Shiino, Kanagawa (JP); Makoto Kimura, Yokohama (JP); Toshiro Yoda, Saitama (JP); Haruhiko Fujita, Tokyo (JP); Yoshimori Kondo, Kanagawa (JP); Yoshiki Sakamoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 327 days.

(21) Appl. No.: 11/281,596

(22) Filed: Nov. 18, 2005

(65) Prior Publication Data

US 2006/0108884 A1 May 25, 2006

(30) Foreign Application Priority Data

Nov. 22, 2004 (JP) .............................. 2004-336806
Sep. 8, 2005 (JP) .............................. 2005-260111

(51) Int. Cl.
*H02K 5/00* (2006.01)
(52) U.S. Cl. ....................................... 310/59; 310/68 B
(58) Field of Classification Search ................... 310/89, 310/83, 68 B
See application file for complete search history.

(56) References Cited

U.S. PATENT DOCUMENTS

| 6,072,254 | A  | * | 6/2000 | Heib et al. ................ 310/68 B |
| 6,491,131 | B1 | * | 12/2002 | Appleyard ................... 180/444 |
| 6,756,711 | B2 | * | 6/2004 | Matsuyama et al. ........ 310/68 R |
| 6,906,483 | B2 |   | 6/2005 | Tominaga et al. |
| 7,095,146 | B2 | * | 8/2006 | Fukazawa et al. ............. 310/89 |
| 2002/0109426 | A1 | * | 8/2002 | Peter et al. ..................... 310/89 |
| 2003/0137202 | A1 |   | 7/2003 | Mao et al. |
| 2006/0108884 | A1 | * | 5/2006 | Shiino et al. .................. 310/89 |

FOREIGN PATENT DOCUMENTS

| DE | 43 15 404 | 11/1994 |
| EP | 0 618 659 | 10/1994 |
| EP | 1 220 429 | 7/2002 |
| JP | 2003-173920 A | 6/2003 |

* cited by examiner

*Primary Examiner*—Nguyen N Hanh
(74) *Attorney, Agent, or Firm*—Antonelli, Terry, Stout & Kraus, LLP

(57) ABSTRACT

A motor control apparatus includes a motor, and a control system board supporting a control circuit to control the motor. The apparatus may further include a power system board supporting a power supply circuit to supply power to the motor. The control system board includes a first board portion facing in a direction along a rotation axis of the motor, and a second board portion extending radially from the first board portion.

59 Claims, 21 Drawing Sheets

FIG.11
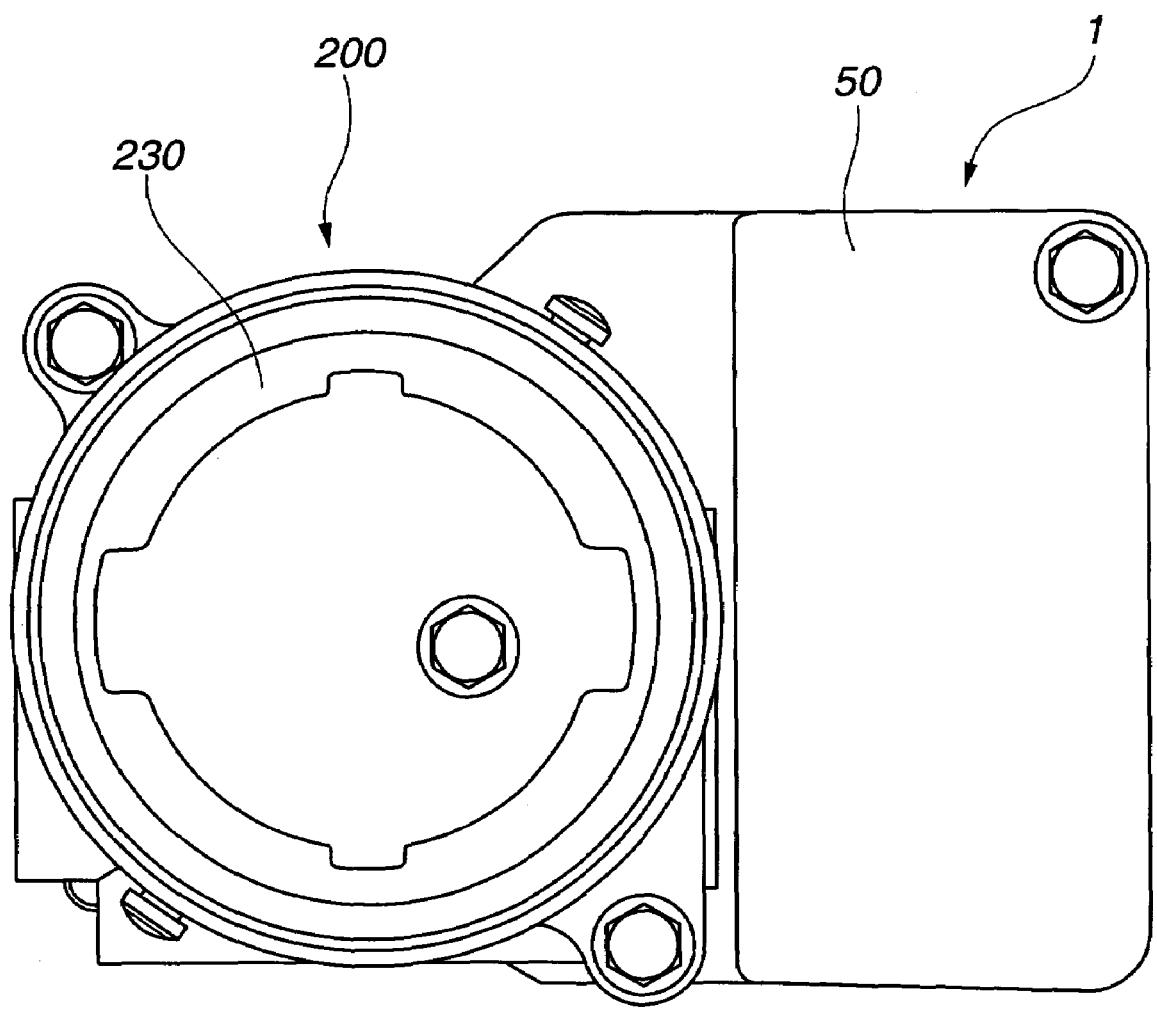
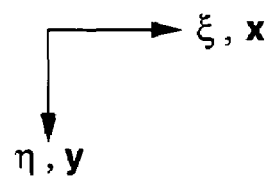

US 7,663,273 B2

MOTOR CONTROL APPARATUS, POWER STEERING APPARATUS AND BRAKE CONTROL APPARATUS

BACKGROUND OF THE INVENTION

The present invention relates to motor control apparatus which can be used for a vehicle power steering system, a vehicle brake system etc.

A United States Patent Application Publication US 2003/0173920 (≈U.S. Pat. No. 6,906,483B2≈JP2003-3267233A) shows electric power steering apparatus including a motor and a motor control system board enclosed in a board housing.

SUMMARY OF THE INVENTION

However, the board housing of the electric power steering apparatus of this US publication is so provided as to increase the entire size of the apparatus.

It is an object of the present invention to provide motor control apparatus which is simplified in construction and compact.

According to one aspect of the present invention, a motor control apparatus comprises: a motor including a rotating member; and a control system board supporting a component of a control circuit to control the motor, and including a first board portion facing in a direction along a rotation axis of the motor, and a second board portion extending radially from the first board portion.

According to another aspect of the invention, the motor control apparatus further comprises an actuating section connected with the motor to receive torque from the motor. The control apparatus may be a power steering system or a brake control system.

BRIEF DESCRIPTION OF THE DRAWINGS

FIG. 11 is a front elevation of the power steering unit of FIG. 8, as viewed in an ζ axis direction.

DETAILED DESCRIPTION OF THE INVENTION

Figure 1:
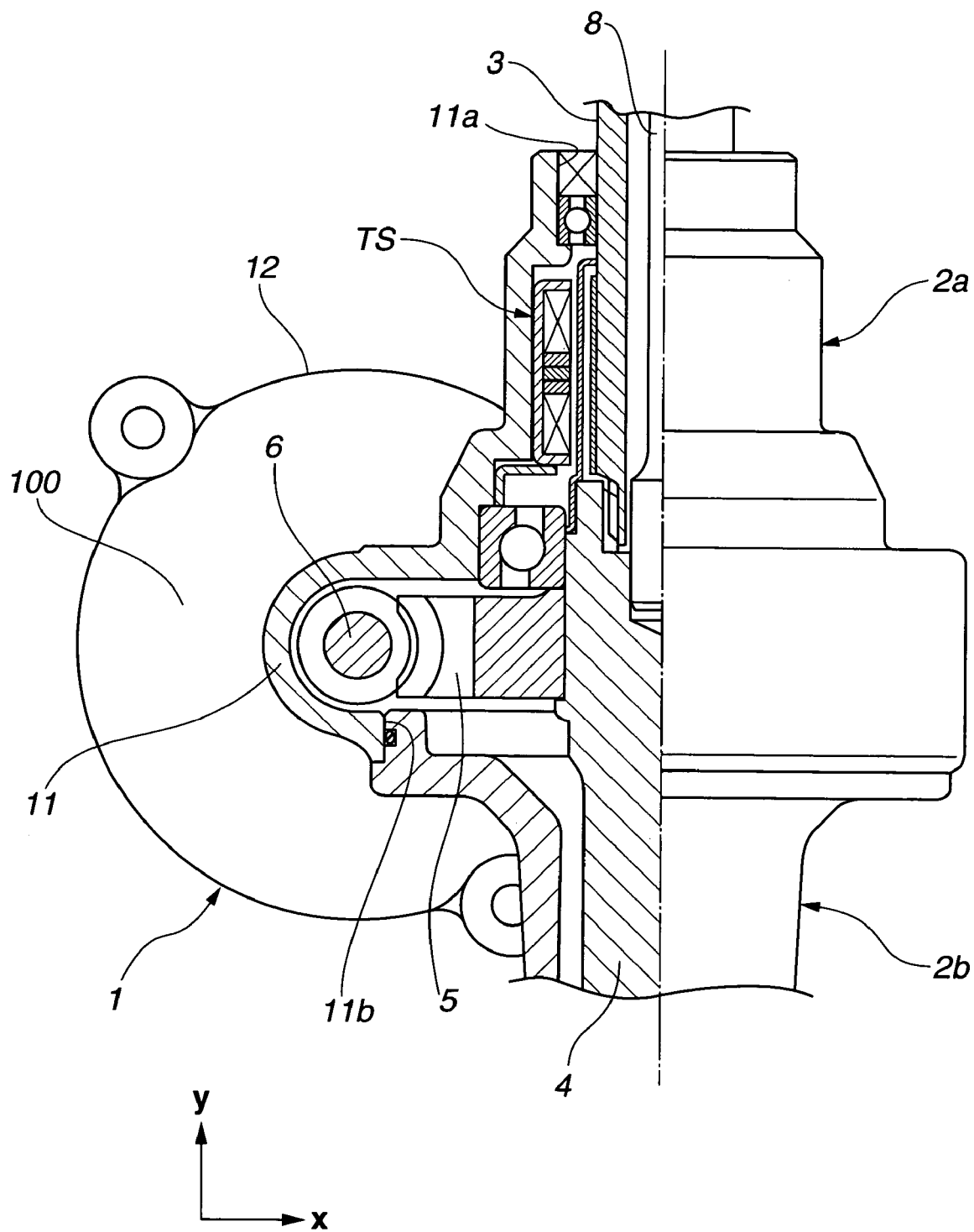
FIG. 1 is a partial sectional view as if cut by a x-y plane, of a motor control apparatus in the form of an electric power steering system according to a first embodiment of the present invention.

FIGS. 1~6 show a motor control apparatus or system according to a first embodiment of the present invention. The motor control apparatus includes at least a motor control section 1. In the first embodiment, the motor control apparatus further includes an actuating section which is combined with motor control section 1, to form an electric power steering system. In these figures, a y axis is parallel to the axial direction of the power steering system; an x axis is perpendicular to the y axis and parallel to the sheet of FIG. 1; and a z axis is perpendicular to the sheet of FIG. 1.

Motor control section 1 of this embodiment includes at least a motor 100, a power system board or substrate 400 for supporting components of a power supply circuit, and a control system board or substrate 300 for supporting components of a control circuit. Motor 100 includes a stator 110 and a rotating member 120 including a rotor. The power supply circuit includes one or more semiconductor switching devices 410 which are mounted on the power system board 400, and which are configured to supply power to motor 100. In this example, each switching device includes an inverters 410. In this example, the control circuit includes a microcomputer for controlling the inverters 410, and the microcomputer is mounted on control system board 300.

Control system board 300 includes at least a first board portion or motor side portion 301, and a second board portion or outer portion 302. First board portion 301 is provided at one end of motor 100, on the z axis positive side of motor 100 that is the upper side of motor 100 as viewed in FIG. 3. First board portion 301 is oriented so that the axis of rotor 120 is perpendicular to first board portion 301. Second board portion 302 extends radially outward from first board portion 301. In this example, control system board 300 is a substantially flat single board, and the first and second board portions 301 and 302 are both substantially flat and substantially even (in the same plane).

Power steering system of this embodiment includes at least the above-mentioned motor control section 1, an assembly housing including a first housing 2a and a second housing 2b, a steering input shaft 3, a pinion shaft 4, a worm wheel 5, a worm shaft 6 (serving as a driven member driven by motor 100), a torque sensor TS, and a rotational position sensor 130. Control system board 300 is disposed so that worm shaft 6 is perpendicular to control system board 300. Control system board 300 is connected with torque sensor TS, power system board 400 and rotational position sensor 130 which is arranged to sense the rotation of motor 200.

Figure 5:
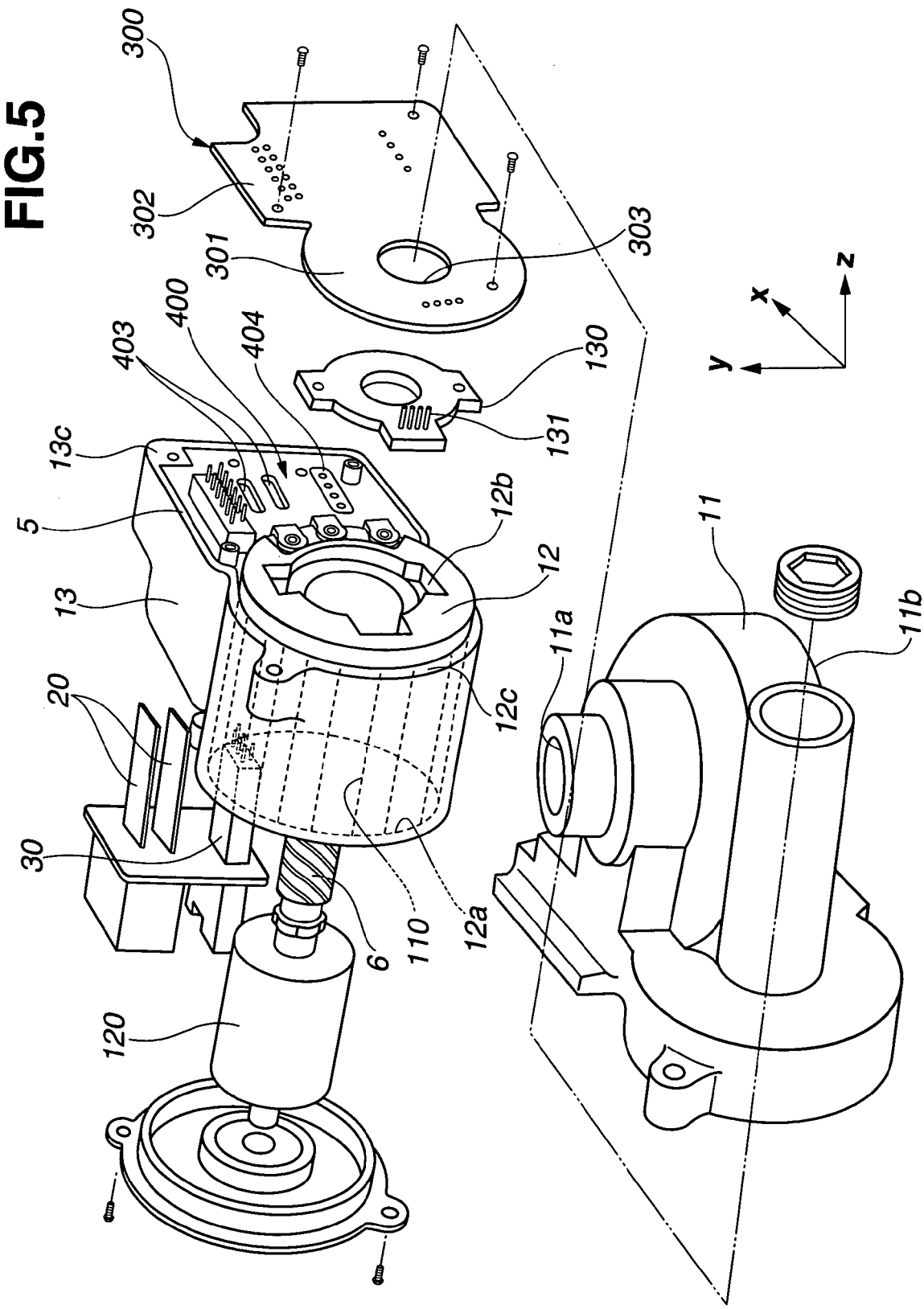
FIG. 5 is an exploded perspective view of the power steering system of FIG. 1.

First housing 2a includes at least a gear housing 11, a motor housing 12, and a power system board housing 13 (as best shown in FIG. 5). In the illustrated example, motor housing 12 and power system board housing 13 are integral with each other, and integral parts of a single housing. Motor housing 12 is provided on the z axis negative side of gear housing 11 (that is the lower side of gear housing 11 as viewed in FIG. 3). Power system board housing 13 is located on the z axis negative side of gear housing 11, and on the x axis positive side of motor housing 12 (that is the right side of motor housing 12 as viewed in FIG. 3).

Gear housing 11 includes a main portion shaped like a cup having a bottom. The bottom of gear housing 11 faces in the y axis positive direction (that is the upward direction as viewed in FIG. 1), and is formed with a through hole 11a through which the steering input shaft 3 is inserted. Gear housing 11 includes an opening 11b on the y axis negative side (that is the lower side as viewed in FIG. 1). Pinion shaft 4, worm wheel 5, control system board 300 and torque sensor TS are inserted sequentially through the opening 11b of gear housing 11.

Steering input shaft 3 is a hollow cylindrical shaft (extending in the y axis direction), and has therein a torsion bar 8. Input shaft 3 is adapted to be connected with a steering wheel of a vehicle. Input shaft 3 is connected through torsion bar 8 with pinion shaft 4. In the gear housing 11, torque sensor TS is disposed around input shaft 3, and arranged to sense the relative rotation between input shaft 3 and pinion shaft 4 due to a steering operation of a driver of a vehicle, and to send a signal to control system board 300.

Figure 3:
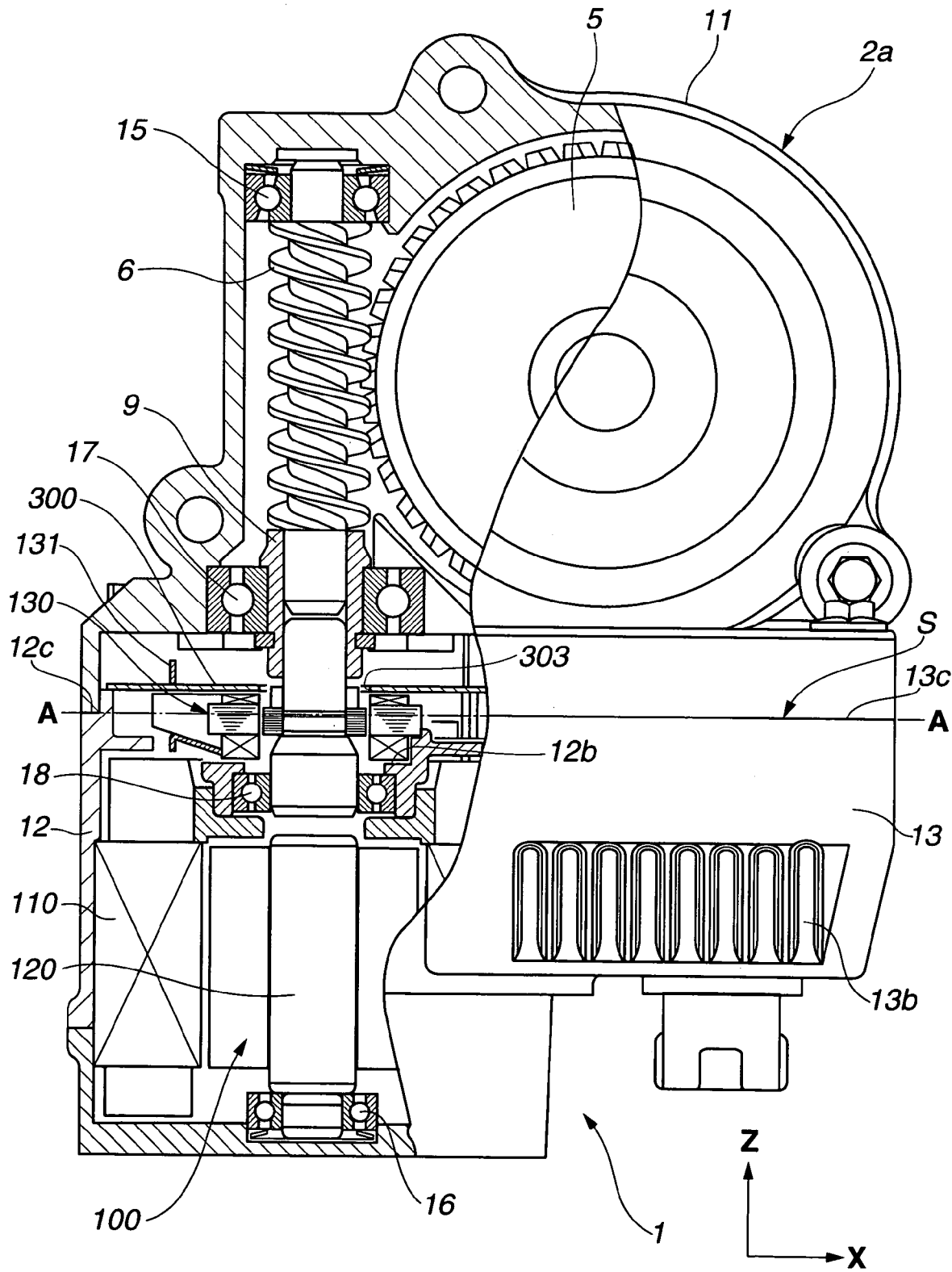
FIG. 3 is a partial section view as if cut by a x-z plane, of the power steering system of FIG. 1.
Figure 4:
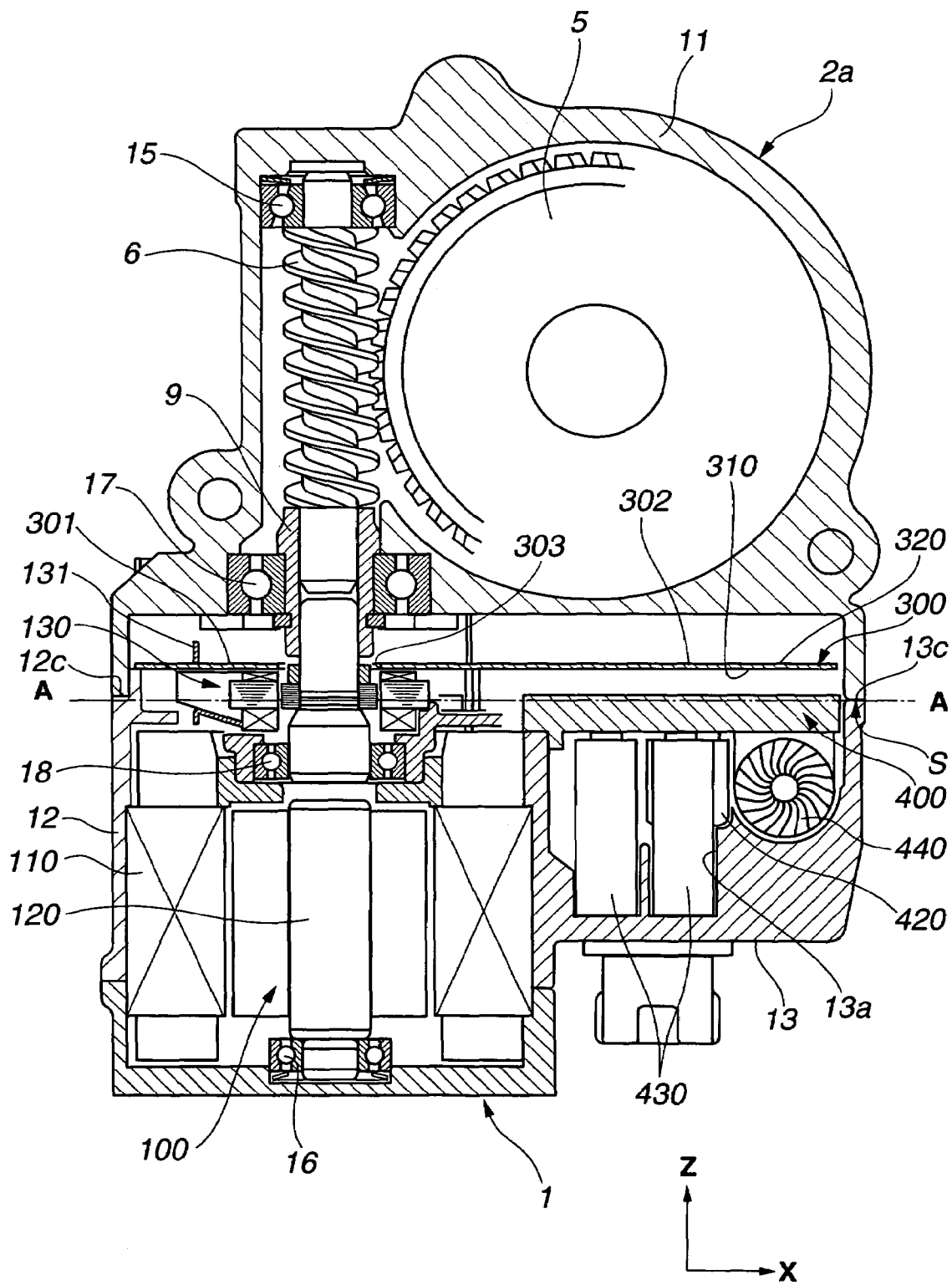
FIG. 4 is a full sectional view, as if cut by a x-z plane, of the power steering system of FIG. 1.

Motor housing 12 encloses motor 100 as shown in FIGS. 3, 4 and 5, and extends in the positive direction of the z axis from a first end formed with a motor insertion opening 12a which is opened in the z-axis negative direction and which is so sized that motor 100 can be inserted therethrough, to a second end defined by an annular end wall formed with a sensor mounting portion 12b which is opened in the z-axis positive direction as best shown in FIG. 5 and which is so shaped that the rotational position sensor 130 can be mounted from the z axis positive direction (from above as viewed in FIG. 3). Motor housing 12 further includes a circumferential wall surrounding stator 110 and rotor 120.

Rotational position sensor 130 is located adjacent to control system board 300 on the z axis positive side of motor housing 12, and interposed between the motor housing 12 on the z axis negative side and the control system board 300 on the z axis positive side (the upper side as viewed in FIG. 3). Control system board 300 is disposed so that the axis of rotor 120 (output shaft of motor 100) is perpendicular to control system board 300. Rotational position sensor 130 is connected, by output terminals 131, with control system board 300. In this example, output terminals 131 are in the form of connecting pins which project perpendicularly from rotational position sensor 130 in the z axis positive direction, and which are inserted in respective pin holes formed in control system board 300 as shown in FIG. 5. Since rotational position sensor 130 is adjacent to control system board 300, output terminals 131 can be made shorter.

Motor 100 of this example is a brushless motor including stator 110 and rotor 120. Current is supplied to stator 110 in accordance with the rotational position of rotor 120 sensed by rotational position sensor 130. Rotational position sensor 130 is fixed to the sensor mounting portion 12b formed in the second end of motor housing member 12, at the position confronting the axial end of rotor 120 on the z axis positive side. Rotational position sensor 130 is enclosed in first housing member 2a so that the connection through output terminals 131 between rotational position sensor 130 and control system board 300 is made easier and more reliable. Motor 100 is not limited to the brushless type. Motor 100 may be a brush motor.

Figure 2:
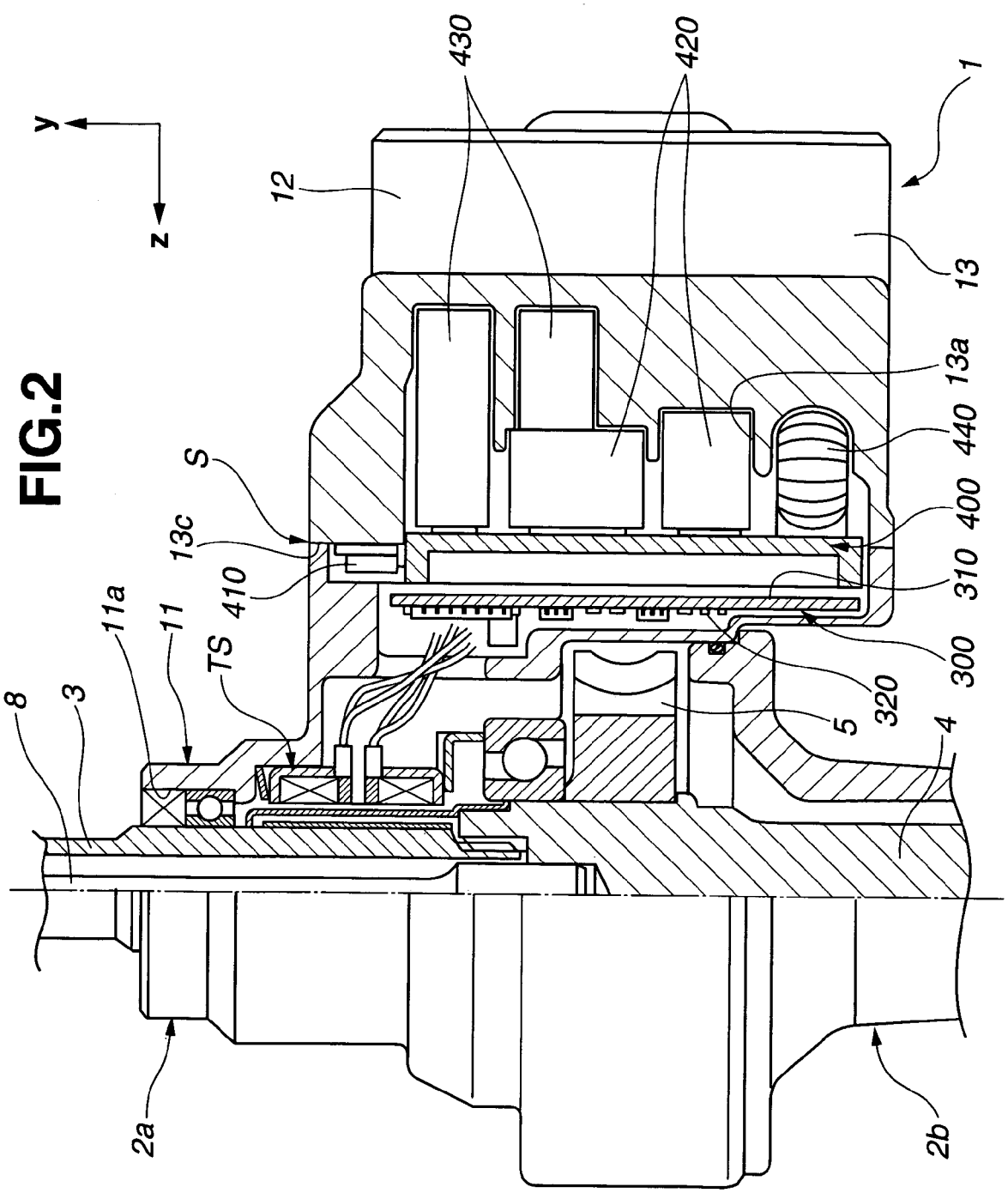
FIG. 2 is a partial sectional view as if cut by a y-z plane, of the power steering system of FIG. 1.

Power system board housing 13 is made of a heat conductive material which, in this example, is an aluminum alloy. In this example, power system board housing 13 is formed by aluminum die casting in order to obtain better cooling effect or improve the ability of heat dissipation. Power system board 400 is enclosed in power system board housing 13. As shown in FIG. 2, power system board housing 13 includes a plurality of power system device receiving portions 13a enclosing and fitting over the power system devices 420, 430 and 440, independently at respective positions. These power system devices are devices mounted on power system board 400. Each of the power system device receiving portions 13a is a socket like portion recessed in the z-axis negative direction (that is the upward direction as viewed in FIG. 2).

A heatsink 13b is provided, as shown in FIG. 3, on the z-axis negative side of power system board housing 13, at the outer circumference of the power system device receiving portions 13a. Heatsink 13b is designed to absorb and dissipate heat of inverters 410 disposed in the power system board housing 13, by increasing the surface area.

The integral housing member composed of motor housing 12 and power system board housing 13 includes an end 12c, 13c facing toward the control system board 300 on the z axis positive side. The end 12c, 13c has a joint surface S to which the gear housing member 11 enclosing the control system board 300 is joined. This joint surface S is substantially flat and even in the same flat plane, that is an A-A plane as shown in FIG. 3.

At the time of assembly, the power system devices 420~440 are fit in the respective receiving (receptacle or socket) portions 13a of power system board housing 13. The receiving portions 13a are designed to individually position the devices 420~440 simply by insertion of the devices in the respective receiving portions 13a. Accordingly, by covering the power system board 400 on the power system board housing member 13 having the power system devices fit in the respective receptacle portions 13a, the power system devices can be readily set at the correct positions in the power system board 400, so that soldering operation for the power system devices becomes easier.

Second housing 2b covers pinion shaft 4 from the y-axis negative side, and closes the opening 11b of first housing 2a, as shown in FIG. 1.

Control system board 300 is disposed between power system board 400 and worm wheel 5, as shown in FIG. 4, and accordingly between motor 100 and worm wheel 5. Control system board 300 in the form of a flat plate is parallel to the x-y plane and perpendicular to the worm shaft 6. Control system board 300 (or the circuit of control system board 300) drives motor 100 by outputting a drive command signal to power system board 400 (or the circuit of power system board 400) in accordance with a steering torque sensed by torque sensor TS.

Control system board 300 is disposed on the z axis positive side of motor 110, that is, on the side on which rotational position sensor 130 is located. Output terminals 131 of this sensor 130 in this example extend substantially straight in the z axis positive direction along the axis of motor 100, so that the longitudinal direction of output terminals 131 is substantially perpendicular to the control system board 300. Output terminals 131 is connected with control system board 300 substantially at right angles.

Control system board 300 has a motor side surface facing the motor housing member 12 in the z-axis negative direction, and an outer side surface facing the gear housing 11 in the z axis positive direction. Control system devices are mounted on both sides of the control system board 300, and the circuit formed on control system board 300 is composed of a motor side circuit 310 formed on the motor side surface and an outer side circuit 320 formed on the outer side surface of control system board 300, as shown in FIG. 2 etc. Thus, both sides of control system board 300 are used for installation of devices, so that the area for mounting various devices is increased. The motor side circuit 310 and outer side circuit 320 are united by control system board 300 into a single circuit board facilitating the assembly and handling operations. Second board portion 302 extends radially from first board portion 302. In the illustrated example, the rotating member 120 of motor 100 includes the rotor and the motor output shaft which is integral with the rotor. The motor output shaft is inserted through the through hole 303.

Power system board 400 is disposed, in first housing 2a, at a position adjacent to control system board 300, and connected electrically with control system board 300 by harness and connectors. Power system board 400 and control system board 300 are close to each other, so that the length of the electrical connection between both boards can be reduced.

In the example shown in FIG. 5, the power supply circuit of power system board 400 and the control circuit of control system board 300 are electrically connected by connecting pins each of which includes a first pin end supported by power system board 400 and a second pin end supported by the second board portion 302 of control system board 300, or inserted in a corresponding pin hole formed in control system board 300.

Power system board 400 extends radially with respect to the axis of motor 100, on the x axis positive side of motor 100, as shown in FIG. 5. Power system board 400 overlaps the second board portion or outer portion 302 of control system board 300. Power system board 400 confronts the second board portion 302 of control system board 300 along the z axis. Power system board 400 and control system board 300 extend substantially in parallel to each other side by side. Accordingly, the connection between both boards is easier.

Power system board 400 includes through portions 403 and 404 (as shown in FIG. 5) for receiving a power supply connector 20 and a signal connector 30 extending in the z-axis positive direction through the power board housing 13 and through power system board 400, toward control system board 300. Power supply connector 20 is a device for supply electric power from the outside. In this example, power is supplied to power system board 400, and further supplied to control system board 300 via power system board 400. Signal connector 30 is for supplying one or more signals representing vehicle operating conditions to control system board 300. These connectors extend straight through housing 13 and power system board 400 toward control system board 300 and these connectors can reach the control system board 300. Therefore, it is easy to deliver a vehicle speed signal and other vehicle operating condition signals to the circuit on control system board 300, from the outside. In this example, the power system board housing 13 also includes through portions for receiving the power supply connector 20 and the signal connector 30.

The power system device group mounted on power system board 40 includes at least relay 420, capacitor 430, and noise removing coil 440, as shown in FIG. 2. On the x axis positive side, there is formed a dead space by a radial outer side of motor 100 (on the x axis positive side) and the x axis positive side portion of control system board 300. Therefore, the relatively large relay 420, capacitor 430 and noise removing coil 440 are installed in this dead space so as to reduce the size of the entire system.

Figure 6:
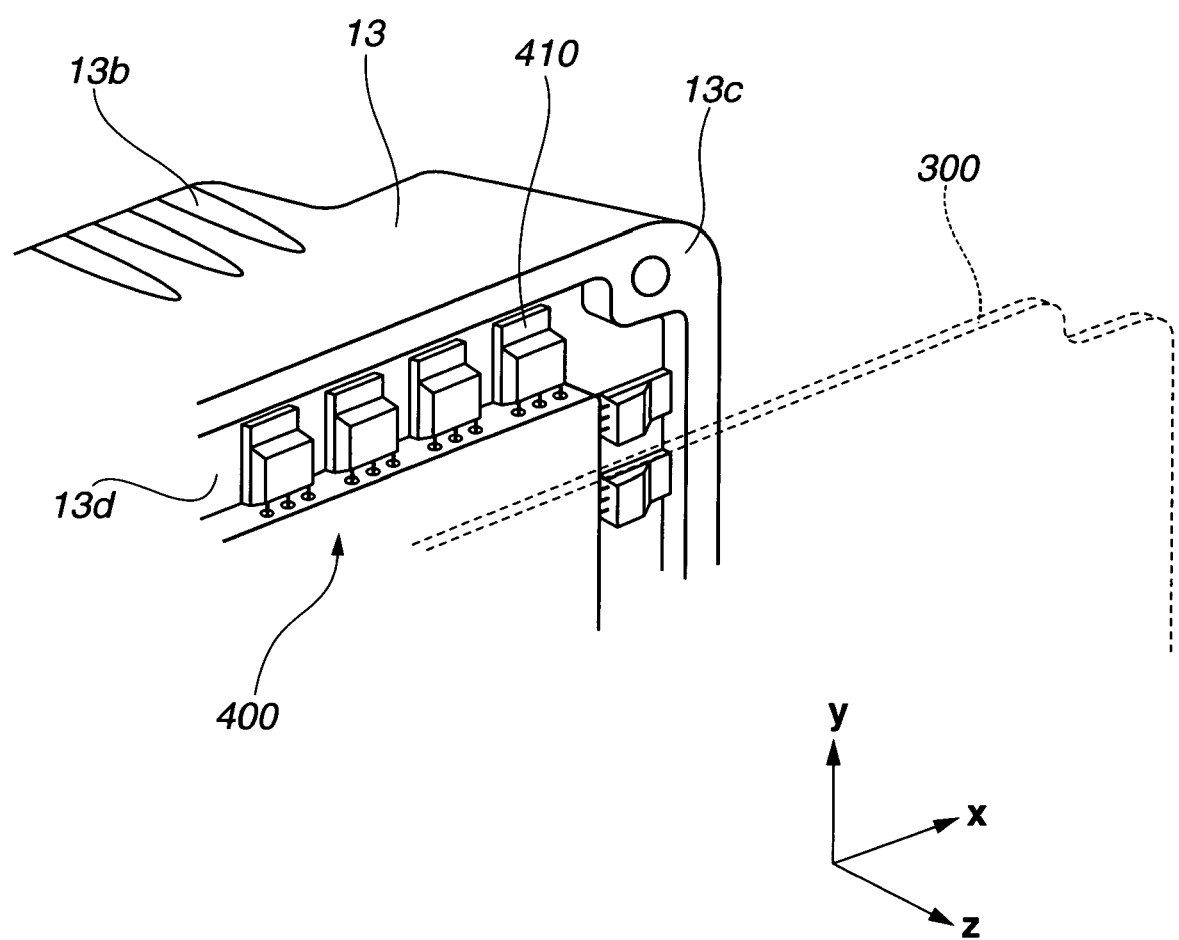
FIG. 6 is a perspective view showing inverters and there vicinity in the power steering system of FIG. 1.

FIG. 6 shows inverters 410 and their vicinity more in detail. Power system board housing 13 includes a first end portion which has heatsink 13b arranged on the outer circumference and which is located on the z-axis negative side, and a second end portion which has an inverter mounting surface 13d on the z-axis positive side and which is formed with an opening for receiving the power system board 400. This inverter mounting surface 13d is substantially flat and parallel to power system board 400. Wall surfaces of inverters 410 are held in contact with the inverter mounting surface 13d. Power system board housing 13 is designed to absorb heat generated by inverters 410 from the inverter mounting surface 13d, and to dissipate the heat from the heat sink 13b.

A steering assist force is produced by motor 100. The driving force of motor 100 is transmitted, through a worm shaft 6 which is provided on the rotation axis of motor 100, to warm wheel 5 and which is connected end to end with the output shaft (120) of motor 100 in alignment. Worm shaft 6 is engaged with worm wheel 5 rotating as a unit with pinion shaft 4. Pinion shaft 4 extends in the y axis negative direction (downward as viewed in FIG. 1) to a portion which is engaged with a rack (not shown). In this way, this steering assist system can drive the rack with a steering assist force by transmitting the driving force of motor 100 to the rack.

FIG. 4 shows an x-z section of first housing 2a. The rotating member of motor 100 includes a large diameter portion serving as the rotor, and a shaft portion serving as the output shaft of motor 100. The output shaft of motor 100 is aligned and coupled with worm shaft 6 (driven member) by a connecting member 9. Worm shaft 6 and rotor 120 are supported, at respective both ends, through bearings 15 and 17 and bearings 16 and 18, on first housing member 2a. Therefore, the positions of worm shaft 6 and rotor 120 are determined only by these bearings. Therefore, it is easier to improve the assembly accuracy simply by improving the accuracy in the positions of bearings 15~18. It is optional to employ a single integral member having an integral portion serving as the worm shaft 6 and an integral portion serving as rotor 120.

In motor control apparatus for an electric power steering system of earlier technology, a control system board for controlling a motor is enclosed in a control board housing for the control system board, and the control board housing is a separate member distinct from a motor housing and a gear housing for a worm gear, so that the size of the entire system is increased. By contrast to this, the control system board 300 according to the first embodiment of the present invention is provided at one axial end of motor 100 (not at a circumference of motor 100). Moreover, in the illustrated example, control system board 300 and rotational position sensor 130 are closely overlapped, and both sides of control system board 30 are used for installing circuit components. Therefore, the first embodiment is advantageous to size reduction, compactness and assembly process.

FIGS. 7~10 show a motor control apparatus according to a second embodiment of the present invention. In the second embodiment, the motor control apparatus includes a motor control section 1, and an actuating section which is combined with the motor control section to form a hydraulic power steering system. In the second embodiment, the motor control section 1 is substantially identical to that of the first embodiment, and the actuating section includes a hydraulic power steering unit 200 in place of the gear housing 11 of the first embodiment. In the second embodiment (unlike the first embodiment), there is provided a housing cover 50 between the motor control section 1 and a pump of in the hydraulic power steering unit 200.

Figure 7:
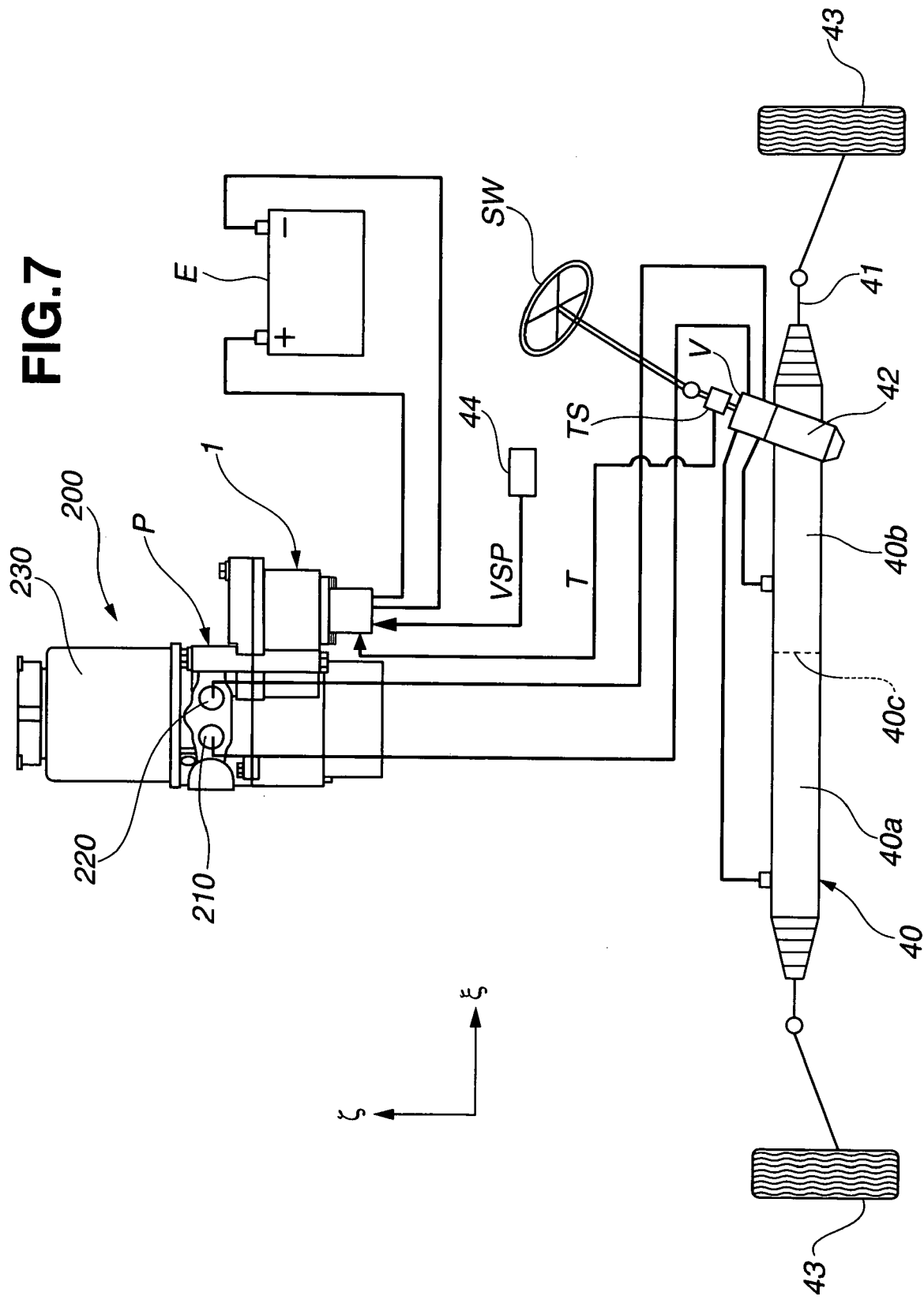
FIG. 7 is a schematic view showing a motor control apparatus in the form of a hydraulic power steering system according to a first practical example of a second embodiment.

FIG. 7 shows a vehicle equipped with the hydraulic power steering system including the motor control section 1, the hydraulic power steering unit 200, a hydraulic cylinder 40, a rack shaft 41, a pinion 42, steerable wheels 43 of the vehicle, a steering wheel SW, a torque sensor TS, a control valve V and a battery E. Hydraulic power steering unit 200 includes a reservoir tank or reservoir 230 and a hydraulic pump P. In this embodiment, a $\xi$ (lateral) axis is an axis extending in the axial direction of the rack shaft 41, a $\zeta$ (vertical) axis is a vertical axis, and a $\eta$ axis is perpendicular to the sheet of FIG. 7.

Pump P of this example is a reversible pump having first and second ports (outlet ports) 210 and 220. Motor control section 1 rotates the pump P in a forward direction or in a reverse direction to produce a steering assist force. Reservoir tank 230 is disposed on the $\zeta$ axis positive side of motor control section 1, that is on the upper side of motor control section 1. Reservoir tank 230 is a container for storing a hydraulic fluid supplied to pump P.

The inside of cylinder 40 is divided, by a piston 40c moving as a unit with rack shaft 41, into first and second cylinder chambers 40a and 40b, which are connected, respectively, through control valve V, with first and second outlet ports 210 and 220 of pump P. Rack shaft 41 is engaged with pinion 42 connected with the steering wheel SW.

In accordance with a steering torque T sensed by torque sensor TS provided in the steering linkage between steering wheel SW and pinion 42, the control circuit of the control system board 300 in motor control section 1 drives the pump P with the motor 100. When the hydraulic fluid is supplied by pump P driven by motor 100 in the direction from first cylinder chamber 40a to second cylinder chamber 40b, the rack shaft 41 moves as a unit with piston 40c in the $\xi$ axis negative direction, that is the leftward direction as viewed in FIG. 7, and provides the steering assist force to the wheels 43 in the $\xi$ axis negative direction. The steering assist force in the $\xi$ axis positive direction is produced by supply of the hydraulic fluid from second cylinder chamber 40b to first cylinder chamber 40a.

Figure 8:
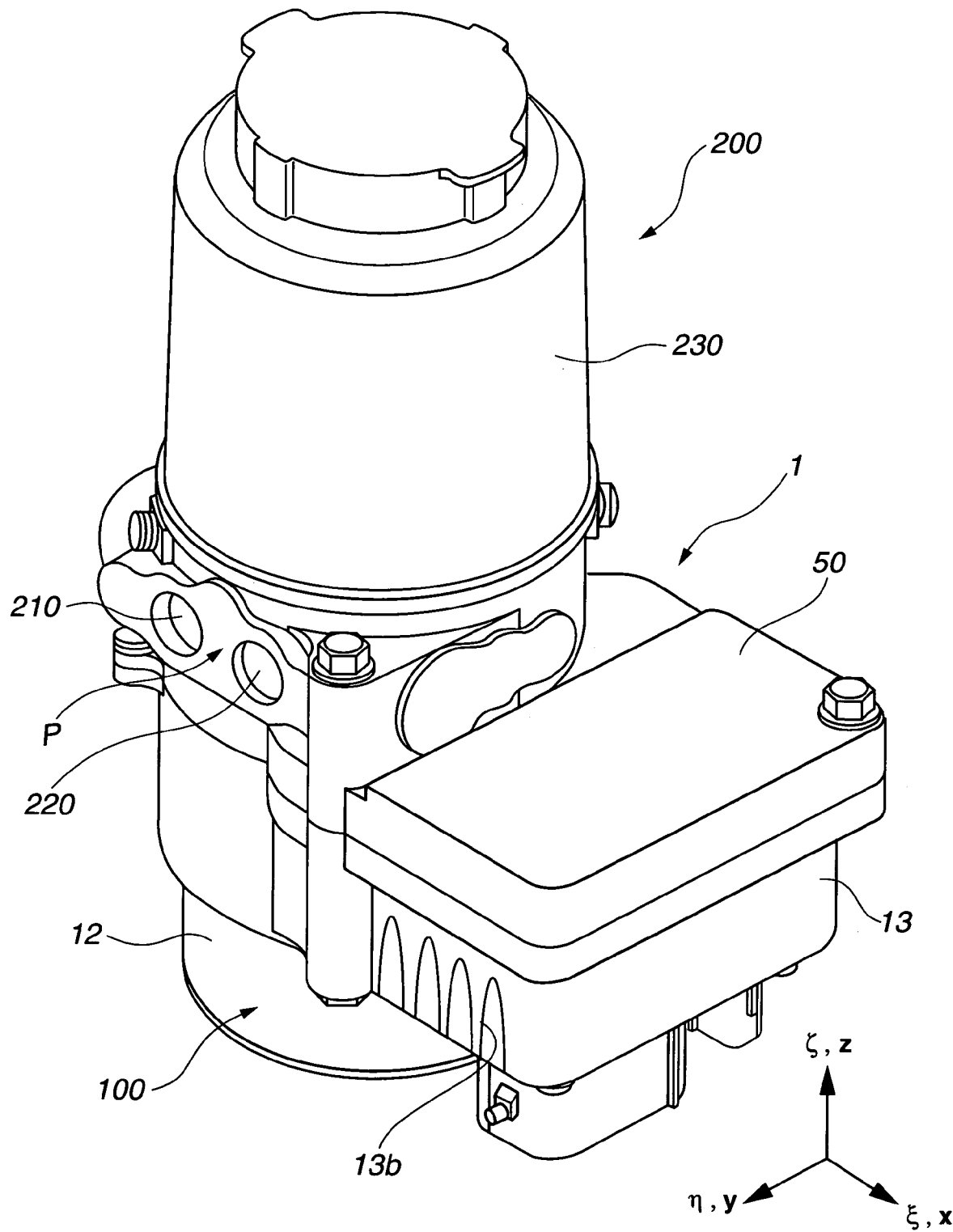
FIG. 8 is a perspective view showing a hydraulic power steering unit of the power steering system of FIG. 7.
Figure 9:
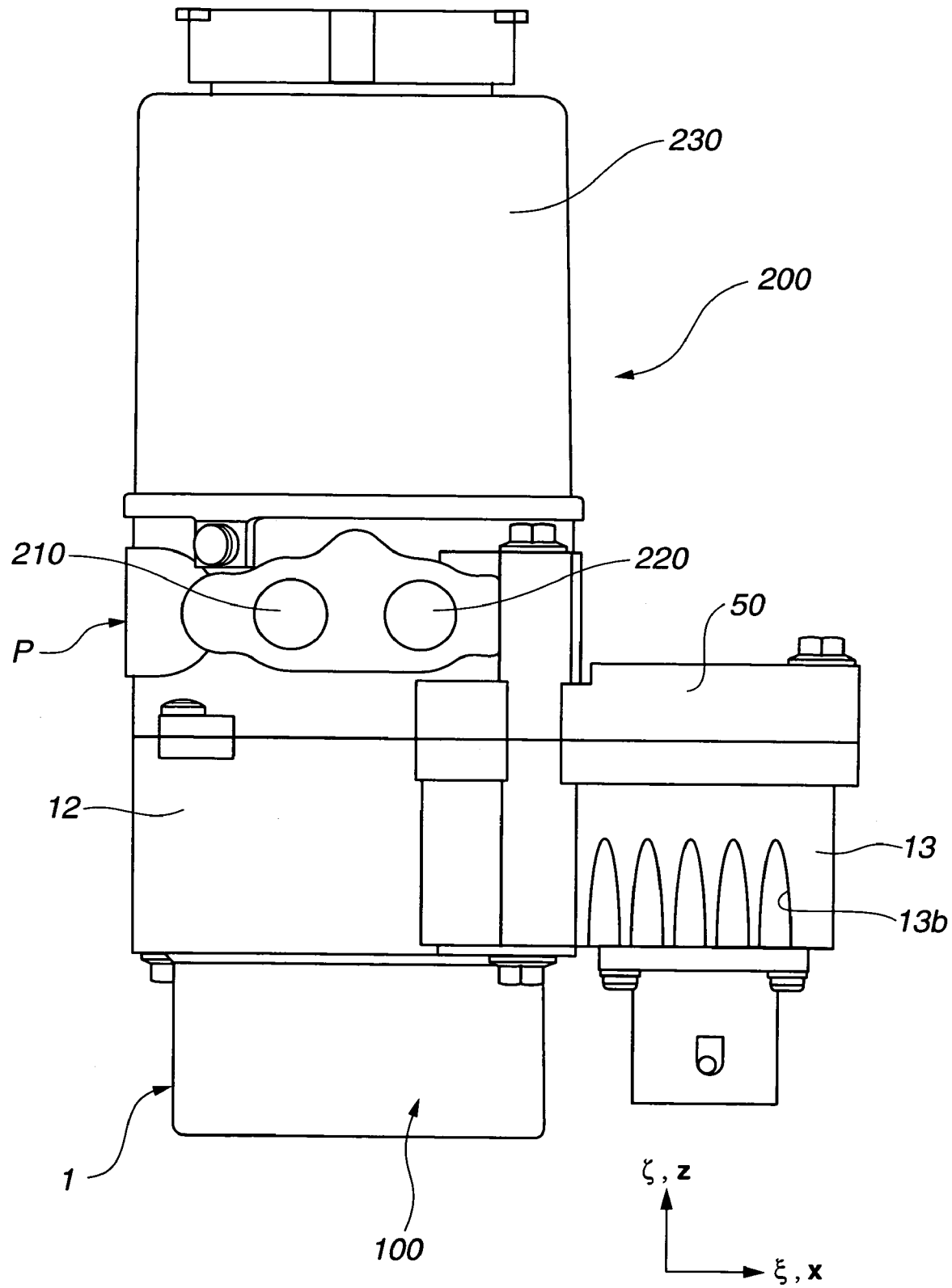
FIG. 9 is a front elevation of the power steering unit of FIG. 8, as viewed in an η axis direction.
Figure 10:
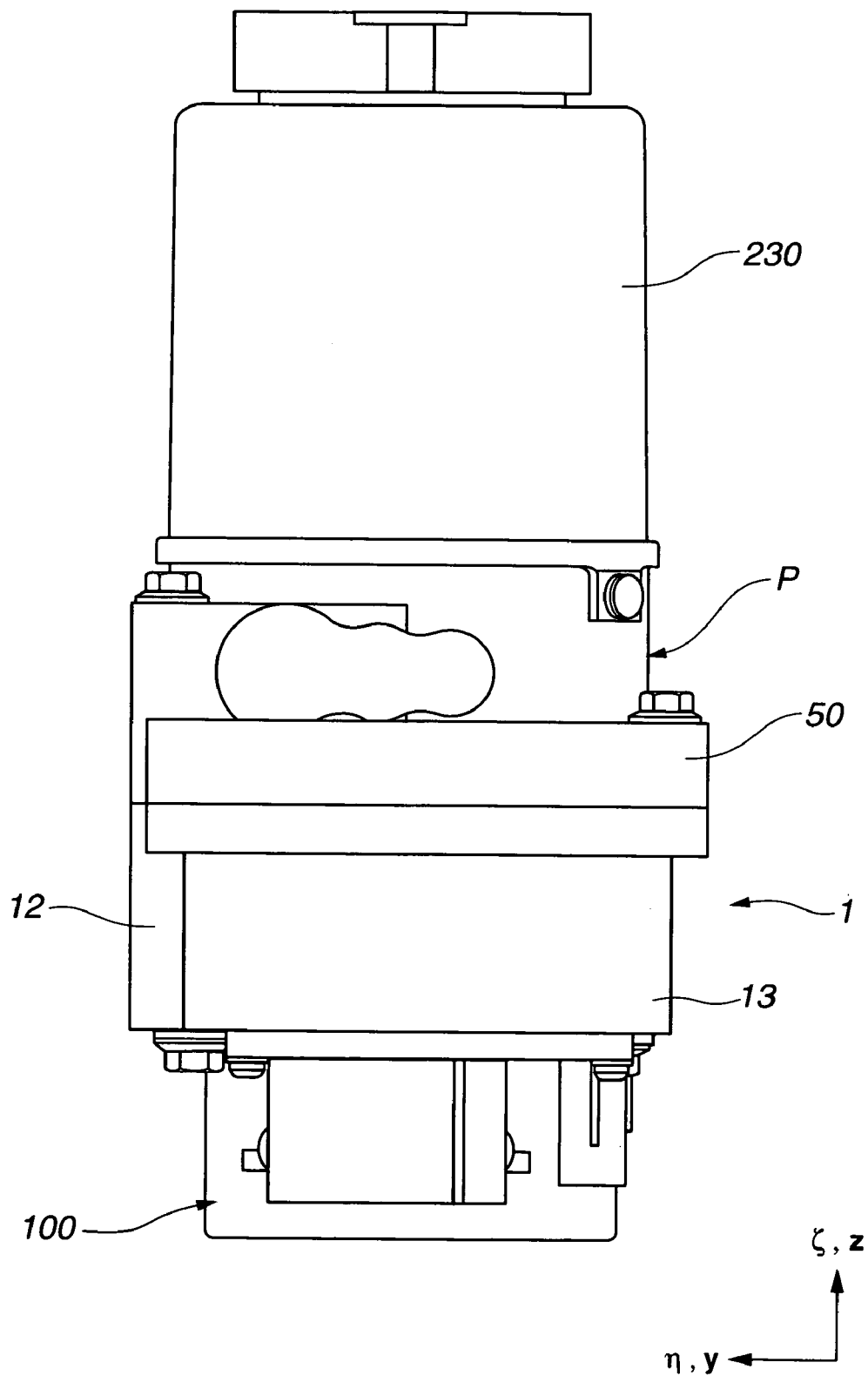
FIG. 10 is a front elevation of the power steering unit of FIG. 8, as viewed in an ξ axis direction.

FIG. 8 is a perspective view of the hydraulic power steering unit 200 which is a single unit including pump P and reservoir tank 230. The hydraulic steering unit 200 according to the second embodiment is further shown in FIG. 9 (front view in the $\eta$ axis direction), FIG. 10 (front view in the $\xi$ axis direction), FIG. 11 (front view in the $\zeta$ axis direction), FIG. 12 (partial sectional view in a $\xi$-$\zeta$ plane), and FIG. 13 (sectional view in a $\xi$-$\zeta$ plane).

Motor control section 1 of the second embodiment is identical in construction to the motor control section 1 employed in the first embodiment. Motor control section 1 is connected with pump P instead of gear housing 11. The z axis extending in the axial direction of motor 100 is directed in the same direction as the $\zeta$ (vertical) axis, and the x axis is directed in the same direction as the $\xi$ (lateral) axis. Thus, the $\xi$-$\zeta$-$\eta$ coordinate system coincides with the x-y-z coordinate system in the first embodiment.

Figure 12:
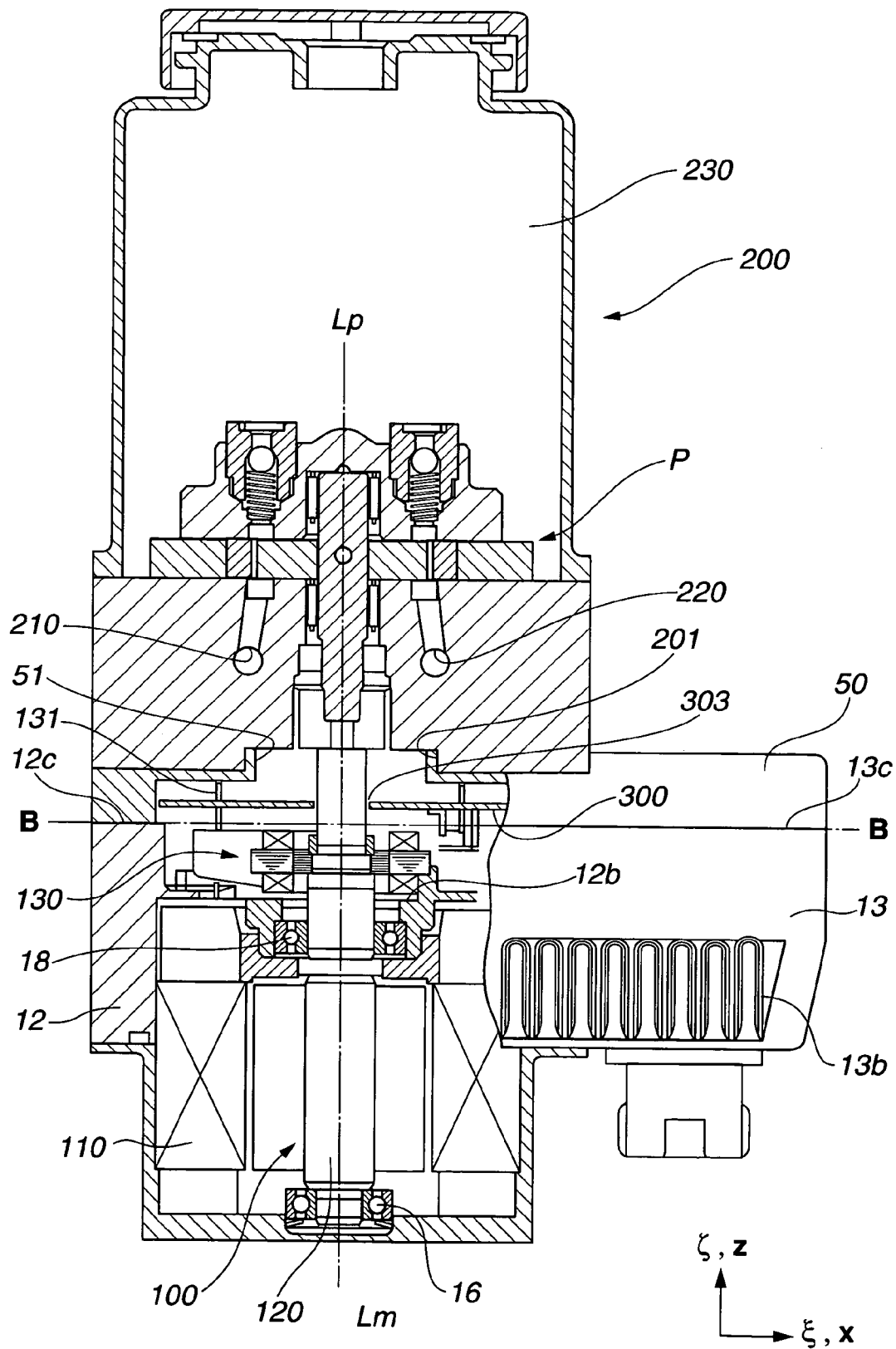
FIG. 12 is a partial sectional view, as if cut by a ξ-ζ plane, of the power steering unit of FIG. 8.
Figure 13:
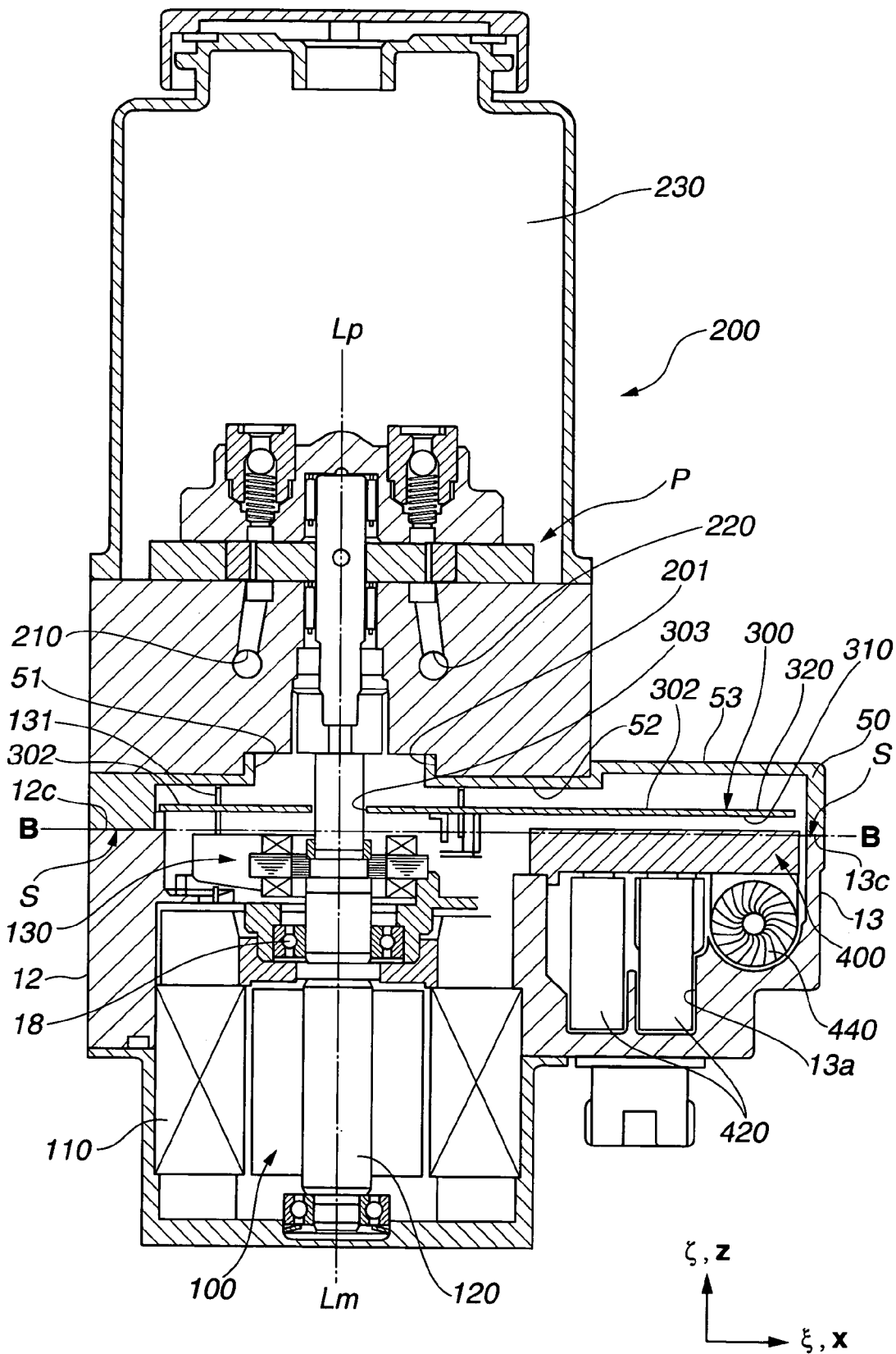
FIG. 13 is a sectional view, as if cut by a ξ-ζ plane, of the power steering unit of FIG. 8.

As in the first embodiment, the control system board 300 in motor control section 1 of the second embodiment is provided on the z axis positive side that is the $\zeta$ (vertical) axis positive side (upper side) of motor 100, as best shown in FIGS. 12 and 13 so that the axis of rotor 120 is perpendicular to control system board 300. Motor housing 12 and power system board housing 13 are integral parts of a single housing. A joint surface S between the housing (12, 13) ant pump P is a flat (horizontal) surface B-B.

Motor housing 12 is disposed on the z axis negative side (lower side) of pump P. Power system housing 13 is disposed on the z axis negative side (lower side) of pump P, and on the x axis positive side of motor housing 12. Pump P of this example is a trochoid pump. However, pump P may be of other types.

The rotational position sensor 130 is disposed on the z axis positive side of motor 100, at the position adjacent to control system board 300, between motor housing 12 and control system board 300. Power system board housing 13 is an aluminum die casting integral with the motor housing 12. Power system board housing 13 has the heatsink 13b on the z axis negative outer side (lower side), and the power system device receiving portions 13a for receiving and positioning the power system devices 420, 430 and 440 independently at respective positions.

Control system board 300 is disposed, between power system board 400 and pump P, at the end of motor 100 on the z axis positive side, and so oriented that the axis of rotor 120 intersects the control system board 300 substantially at right angles. The output terminals 131 of rotational position sensor 130 extend in the z axis positive 20 direction, that is the upward direction, fittingly into respective holes in control system board 300 substantially at right angles. The motor side circuit 310 and outer side circuit 320 are formed on both sides of control system board 300, as in the first embodiment.

Control system board 300 includes the first board portion 301 formed with the through hole 303, and the second board portion 302 projecting radially outwards from the first board portion 301. The output shaft of motor 100 extends upwards through the through hole 303 of control 30 system board 300. The opening size or the diameter of through hole 303 is made small to increase the area for installation of components of the control circuit on control system board 300. The diameter of the through hole 303 is smaller than the outside diameter of rotational position sensor 130. In this example, the diameter of the through hole 303 is smaller than the inside diameter of a stationary annular portion of the rotational position sensor 130.

Reservoir tank 230 is disposed on the z axis positive side, that is, the vertical upper side of the through hole 303, and motor 100 is disposed on the z axis negative side, that is the vertical lower side, of the through hole 303. A leakage of the hydraulic fluid from reservoir tank 230 can flow down on the output shaft 120 inserted upward through the through hole 303, and flows through an annular clearance between the output shaft 120 and the through hole 303, to the lower side of control system board 300 toward motor 100. This arrangement helps protect the control system board 300 from being wetted by the hydraulic fluid flowing by leakage from the reservoir tank 230.

Power system board 400 is placed horizontally, closely under the second board portion 302 of control system board 300. In the dead space on the x axis positive side of motor housing 12, the relay 420, capacitor 430 and nose reducing coil 440 having relatively large volumes are supported on power system board 400.

Power system board 400 is located on the x axis positive side of motor 100, at such a circumferential position around motor 100 that the power system board 400 overlaps the second board portion 302 of control system board 300. The power supply connector 20 and signal connector 30 are passed through the through portions 403 and 404 of power system board 400, respectively. A vehicle speed signal VSP of a vehicle speed sensor 44 is supplied to the circuit of control system board 300 through signal connector 30. In the second embodiment, too, one or more inverters 410 are mounted on power system board 400, and arranged in the same manner as in the first embodiment, as shown in FIG. 6.

The housing cover 50 is provided between the pump P and the integral housing composed of motor housing 12 and power system board housing 13, as best shown in FIG. 13, and arranged to close the opening defined by the z axis positive side ends 12c and 13c of the integral housing (12, 13).

Housing cover 50 includes a fitting portion 51, and a casing member of pump P includes a fitting portion 201. The fitting portions 51 and 201 are engaged with each other to align the rotation axis Lp of pump P with the rotation axis Lm of motor 100. In this example, the fitting portion 201 is depressed upward, and the fitting portion 51 is projected upward and fit in the fitting portion 201, as shown in FIG. 13. The rotating shaft of pump P and the output shaft of motor 100 are thus aligned and connected drivingly end to end with each other through the holes of the fitting portions 51 and 201.

Housing cover 50 includes a first (pump side) cover portion 52 located between the pump P and motor 100, and a second (outer) cover portion 53 extending radially outwards from the first cover portion 52 beyond the circumference of pump P. The height of second cover portion 53 in the z axis direction or vertical direction is greater than the height of first cover portion 52, as shown in FIG. 13. Therefore, second cover portion 53 can cover taller components mounted on the upper side of control system board 300. The axial or vertical dimension of the whole system can be reduced by mounting shorter components on the first board portion 301 of control system board 300 under the first cover portion 51, and mounting taller components on the second board portion 302 of control system board 300 under the second cover portion 52.

In the second embodiment, the reversible pump P having two outlet ports 210 and 220 is driven in the forward and reverse direction by the motor control section 1. By using the motor control section 1 arranged compactly as in the first embodiment, the power steering system is made compact and simple.

Figure 14:
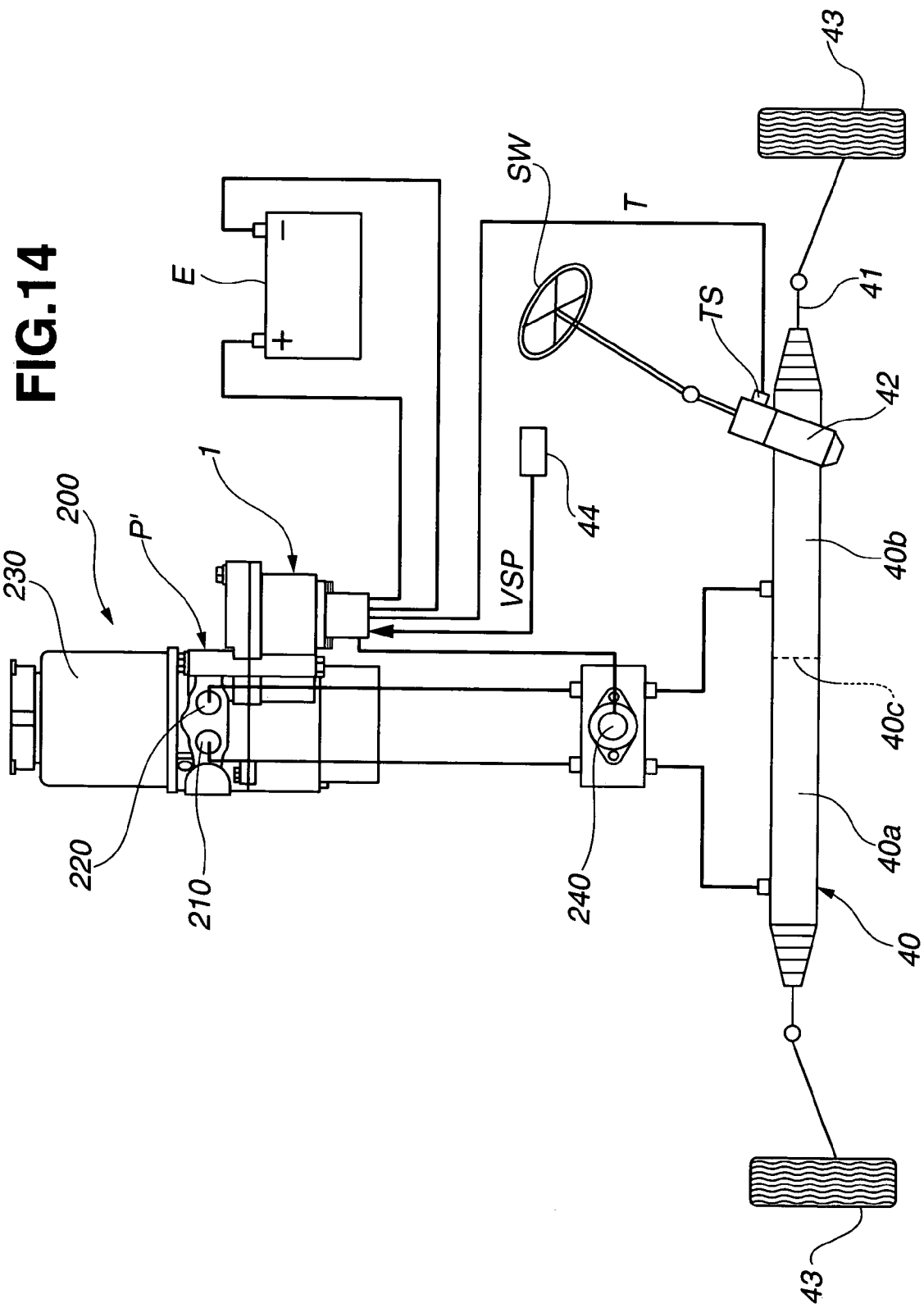
FIG. 14 is a schematic view showing a motor control apparatus in the form of a hydraulic power steering system according to a second practical example of the second embodiment.

FIG. 14 shows a variation (or a second practical example) of the second embodiment. The hydraulic power steering system shown in FIG. 14 is different from the power steering system of FIG. 7 in the following points. A one-direction pump P' is employed in place of reversible pump P. A control valve 240 is provided between pump P' and the hydraulic cylinder 40, and arranged to change over the suck/discharge of the hydraulic fluid to produce the steering assist force in the desired directions. The power steering system of FIG. 14 can provide advantageous effects as in the system of FIG. 7.

Figure 15:
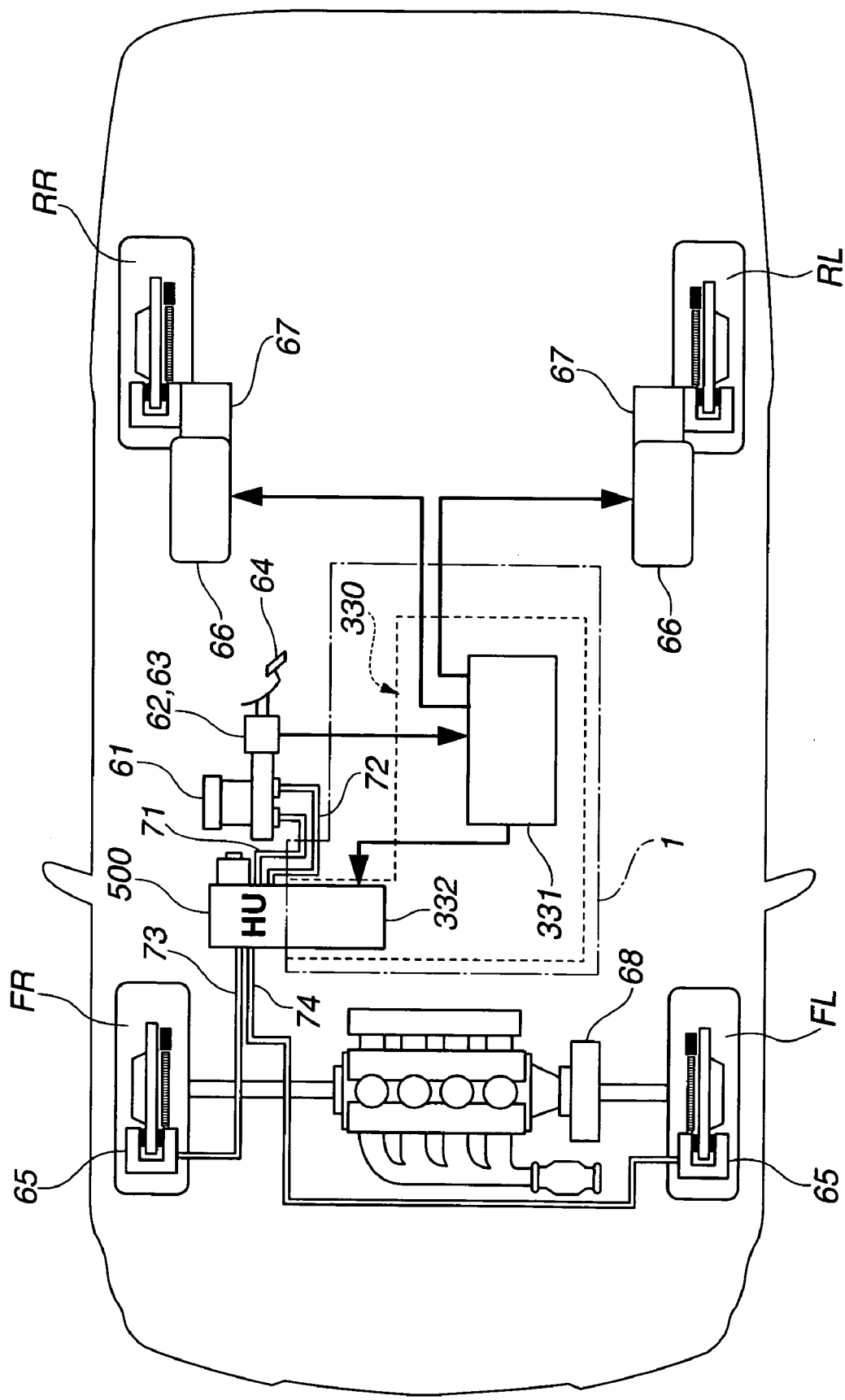
FIG. 15 is a schematic view showing a motor control apparatus in the form of a brake control system according to a first practical example of a third embodiment.
Figure 16:
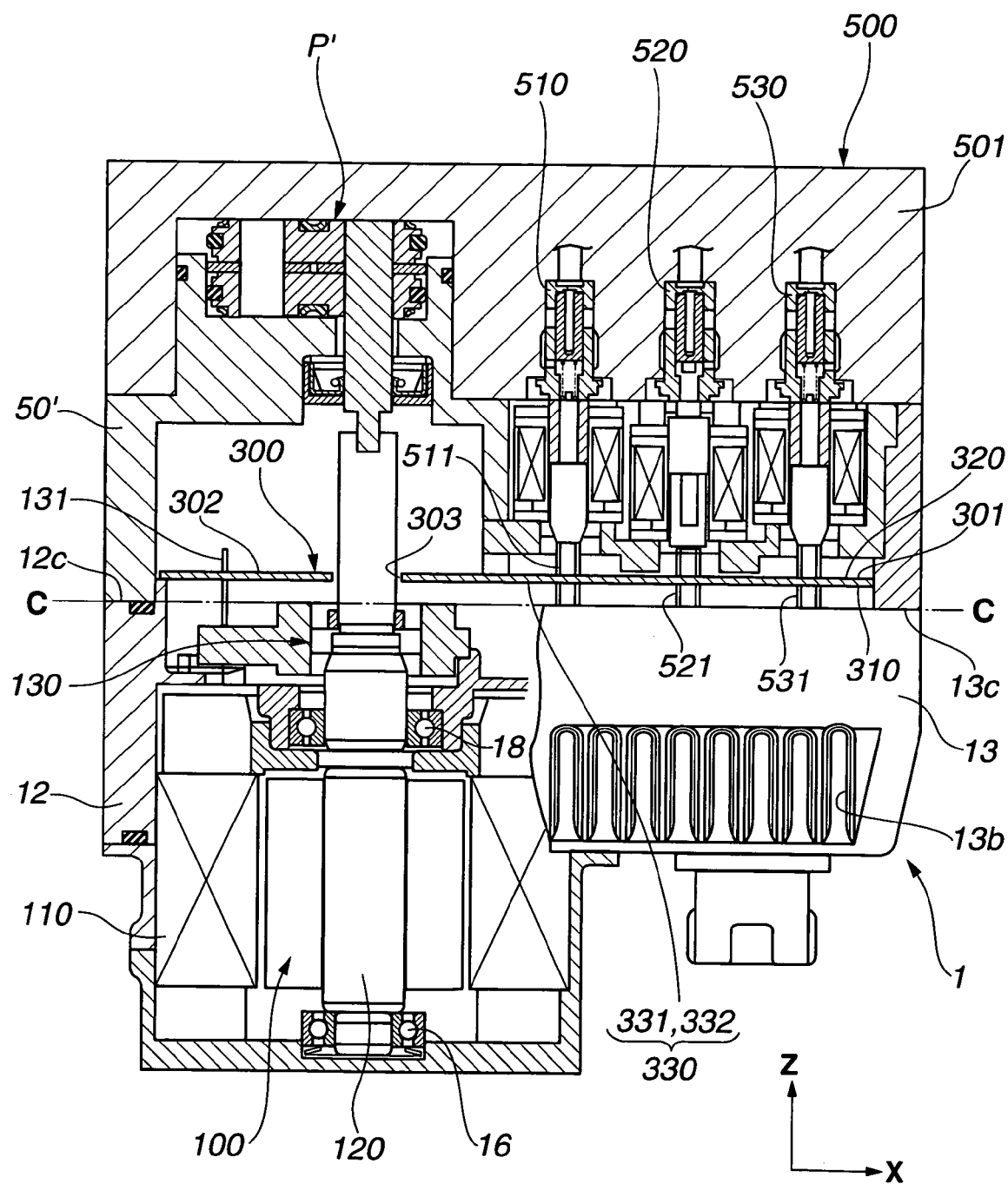
FIG. 16 is a partial sectional view, as if cut by a x-z plane, of a brake control unit of the brake control system of FIG. 15.
Figure 17:
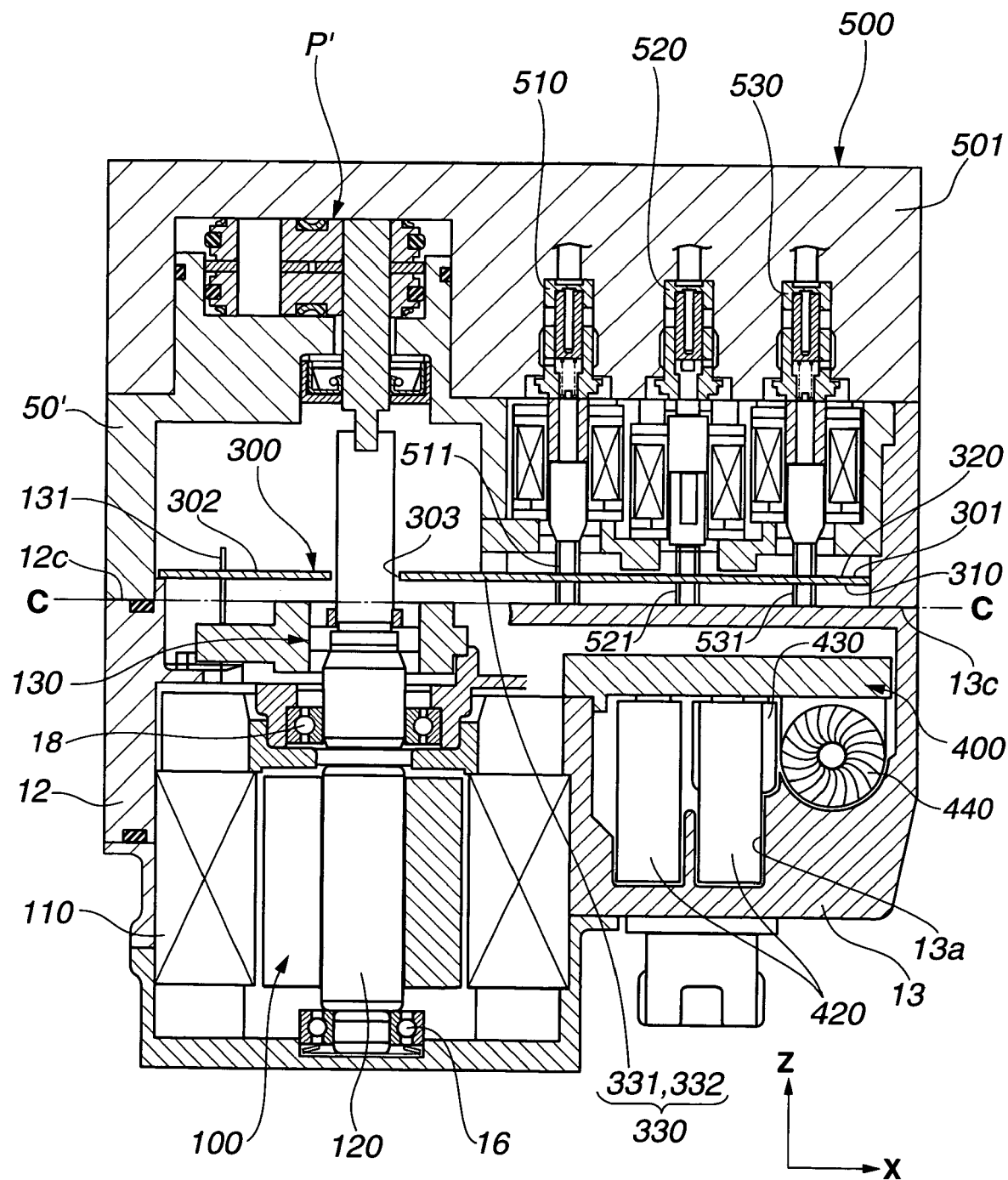
FIG. 17 is a sectional view of the brake control unit of the brake control system of FIG. 15.

FIGS. 15~17 show a motor control apparatus in a first practical example according to a third embodiment of the present invention. In the third embodiment, the motor control apparatus includes a motor control section 1, and an actuating section which is combined with the motor control section to form a hydraulic brake control system. In the third embodiment, the motor control section 1 is substantially identical to that of the first embodiment, and the actuating section includes a brake control unit 500.

FIG. 15 shows a vehicle equipped with the brake control system according to the third embodiment. The brake control system shown in FIG. 15 is a brake-by-wire system. In this example, the brake system include hydraulic brake actuators 65 for front wheels FR and FL, and electric brake actuators 67 for braking rear wheels RR and RL electrically without using the hydraulic pressure. However, the present invention is not limited to this brake system. For example, it is optional to employ hydraulic brake actuators for all the four wheels.

The brake control unit 500 includes a pump P' for supplying the hydraulic pressure to hydraulic brake actuators 65 for braking the front wheels, and solenoid valves 510, 520 and 530 for controlling the hydraulic pressure supplied from pump P'. This brake control unit 500 is connected with the motor control section 1 identical to the motor control section according to the first and second embodiments.

In the third embodiment, a microcomputer 330 is mounted on the control system board 300 (as shown in FIGS. 16 and 17). Microcomputer 330 is configured to control inverters 410 in accordance with a brake pedal condition or a wheel slip condition. In this example, microcomputer 330 serves as a main ECU 331 for fluid pressure calculation and solenoid valve control, and a brake ECU 332. However, it is optional to employ two or more microcomputers for main ECU 331 and brake ECU 332. Inverters 410 are mounted in the same manner as in the first embodiment (as shown in FIG. 6).

A master cylinder 61 is provided with a stroke sensor 62 and a stroke simulator 63. When a brake pedal 64 is depressed by a driver, the master cylinder 61 produces a fluid pressure, and the stroke sensor 62 sends a stroke signal representing the stroke or depression degree of brake pedal 64, to main ECU 331. The master cylinder pressure produced by master cylinder 61 is supplied through oil passages 71 and 72, to brake control unit 500, and the fluid pressure controlled by brake control unit 500 is supplied through oil passages 73 and 74, to the front wheel cylinders (or actuators) 65.

Main ECU 331 calculates a desired front wheel fluid pressure in accordance with the stroke signal, taking account of a vehicle operating condition or vehicle motion variable such as a vehicle speed and a vehicle yaw rate; controls the fluid pressures of the wheel cylinders 65 by sending a command signal through brake ECU 332, to brake control unit 500; and acts to brake the front wheels with a regenerative brake unit 68 on braking. The rear wheel brake actuators 66 control the braking forces of respective electric calipers 67 in response to command signals from main ECU 331.

Brake control unit 500 includes pump P' and solenoid valves 510~530. In the case of a normal brake operation of the brake-by-wire system, brake control unit 500 shuts off the connection between master cylinder 61 and wheel cylinders 65, and supplies the fluid pressures to wheel cylinders 65 with pump P' (shown in FIGS. 16 and 17) to produce the braking force. If a wheel locking tendency is increased by an abrupt braking operation of the driver, the brake control unit 500 drives solenoid valves 510~530 to decrease the wheel locking tendency, and shuts off the supply of the fluid pressure from master cylinder 61 to the front wheel cylinders 65.

Thus, brake control unit 500 drives the solenoid valves 510~530 in the unit appropriately and thereby decreases the brake fluid pressures in front wheel cylinders 65 to produce the braking force while preventing wheel locking. When the brake-by-wire system is unable to function properly, the brake control unit 500 produces the braking force by allowing the supply of the master cylinder pressure to wheel cylinders 65.

The motor control section 1 and the brake control unit 500 are united into a single unit as shown in a x-z plane partial sectional view of FIG. 16, and an entire sectional view of FIG. 17. Motor control section 1 is identical to that of the first and second embodiments.

Motor control section 1 is joined with brake control unit 500 in place of gear housing 11 of the first embodiment, in a flat joint plane C-C. Brake control unit 500 includes hydraulic pump P', and is joined, through a housing cover 50', with the housing composed of the motor housing 12 and power system board housing 13.

Pump P' of this example is of an external gear type, and is driven by the motor 100. However, it is optional to employ a pump of any other type. The solenoid valves 510~530 for regulating the brake fluid pressure are provided on the x axis positive side of pump P' (on the right side of pump p' in FIGS. 16 and 17).

Solenoid valves 510~530 includes connection terminals 511~531, and these solenoid valves 510~530 are mounted so that the terminals 511~531 confront the control system board 300 of motor control section 1. Terminals 511~531 projects to control system board 300 in the z axis negative direction, and are connected with the control circuit on control system board 300. Brake control ECU 332 of microcomputer 330 mounted on control system board 300 is configured to control the brake fluid pressure by controlling the open/close states of the solenoid valves 310~330 in accordance with a command signal from main ECU 331.

In the third embodiment, too, housing cover 50' is placed between pump P' and the housing composed of motor housing 12 and power system board housing 13, and arranged to close the opening defined by the z axis positive side ends 12c and 13c of the housings 12 and 13. Housing cover 50' includes a fitting portion which is fit in a recessed portion of a housing 501 of brake control unit 500, and which is shaped to fittingly receive pump P'. Therefore, the fitting portion of housing cover 50' makes it easy to determine the positions of pump P' and motor 100, and to align the motor rotation axis Lm of motor 100 and the pump rotation axis Lp of pump P'.

By the combination of motor control section 1 and brake control unit 500 including pump P' and solenoid valves 510~530, the third embodiment can provide the same advantageous effects as in the first and second embodiments.

Figure 18:
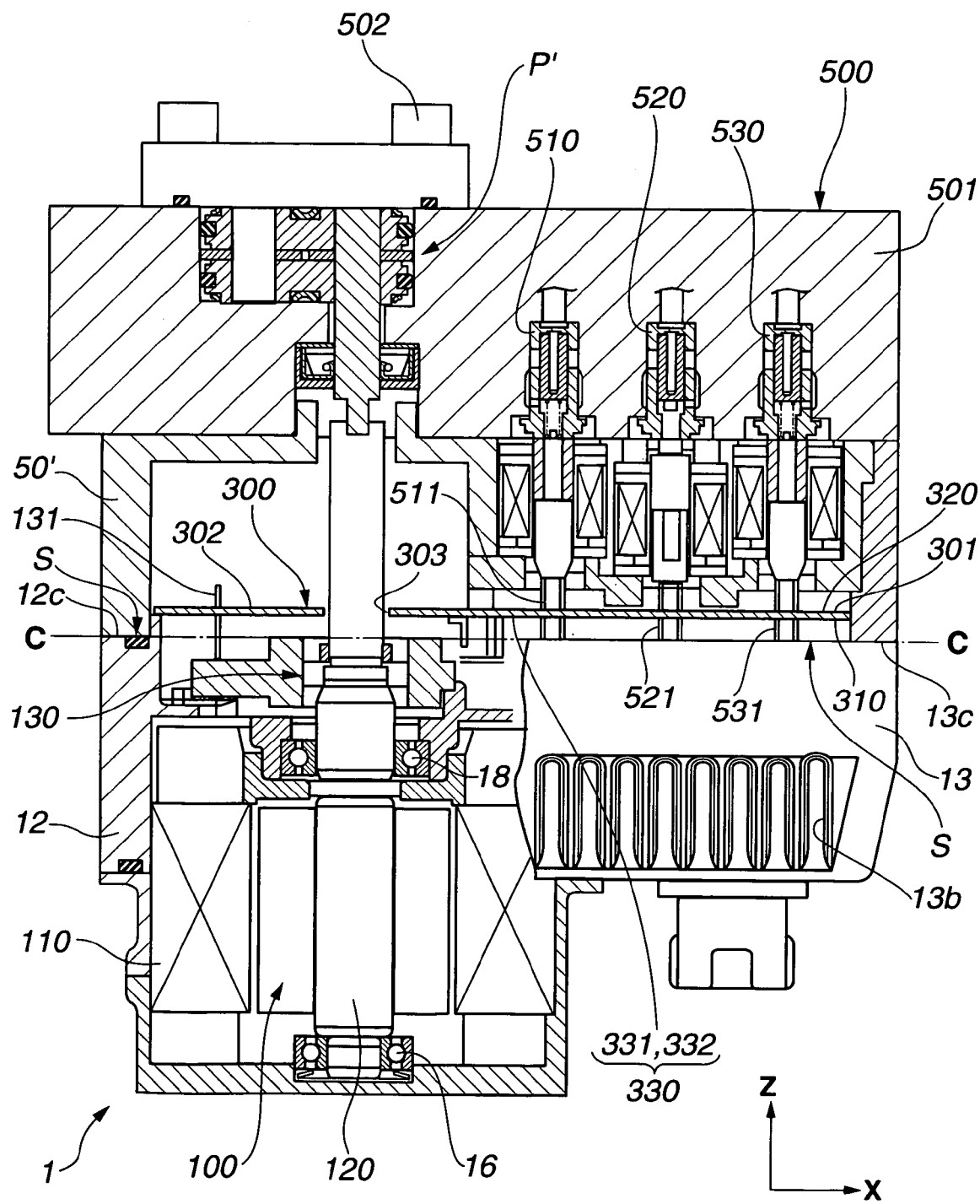
FIG. 18 is a sectional view of a brake control unit housing of a brake control system according to a second practical example of the third embodiment.

FIG. 18 shows a second practical example according to the third embodiment. In the second practical example, pump P' is received in a recess formed in the brake control unit housing 501, and covered with a cover 502 located on the z axis positive side of the housing 501.

Figure 19:
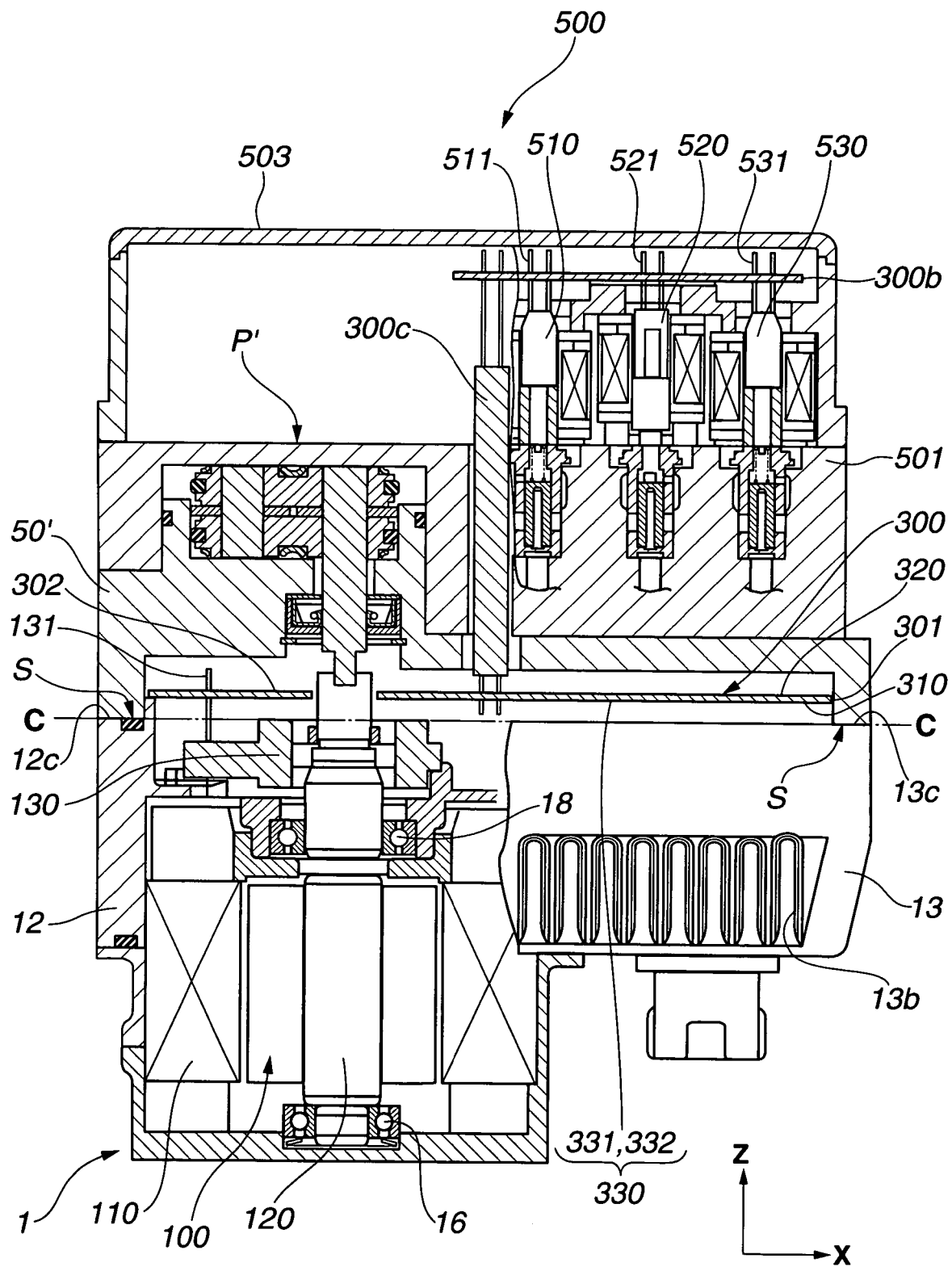
FIG. 19 is a sectional view of a brake control unit housing of a brake control system according to a third practical example of the third embodiment.

FIG. 19 shows a third practical example according to the third embodiment. In the third practical example, there is provided a second control system board 300b in addition to the first control system board 300 (or 300a). The first control system board 300 is substantially identical to that of the first practical example shown in FIGS. 16 and 17. In this example, the first and second control system boards 300 and 300b are substantially parallel to each other, and both boards 300 and 300b are connected by a connecting member 300c extending along the z axis. The first control system board 300 on the z axis negative side is enclosed by motor housing 12, power system board housing 13 and housing cover 50'. Second control system board 300b on the z axis positive side is enclosed by brake system unit housing 501 and cover 503. Solenoid valves 510~533 are placed between the first and second control system boards 300 and 300b. The connection terminals 511, 521 and 531 of first, second and third solenoid valves 510, 520 and 530 projects in the z axis positive direction toward second control system board 300b, and these terminals 511, 521 and 531 are connected with second control system board 300b. In the first practical example shown in FIGS. 16 and 17, the connection terminals 511, 521 and 531 of first, second and third solenoid valves 510, 520 and 530 projects in the z axis negative direction toward the control system board 300, and these terminals 511, 521 and 531 are connected with the control system board 300.

Figure 20:
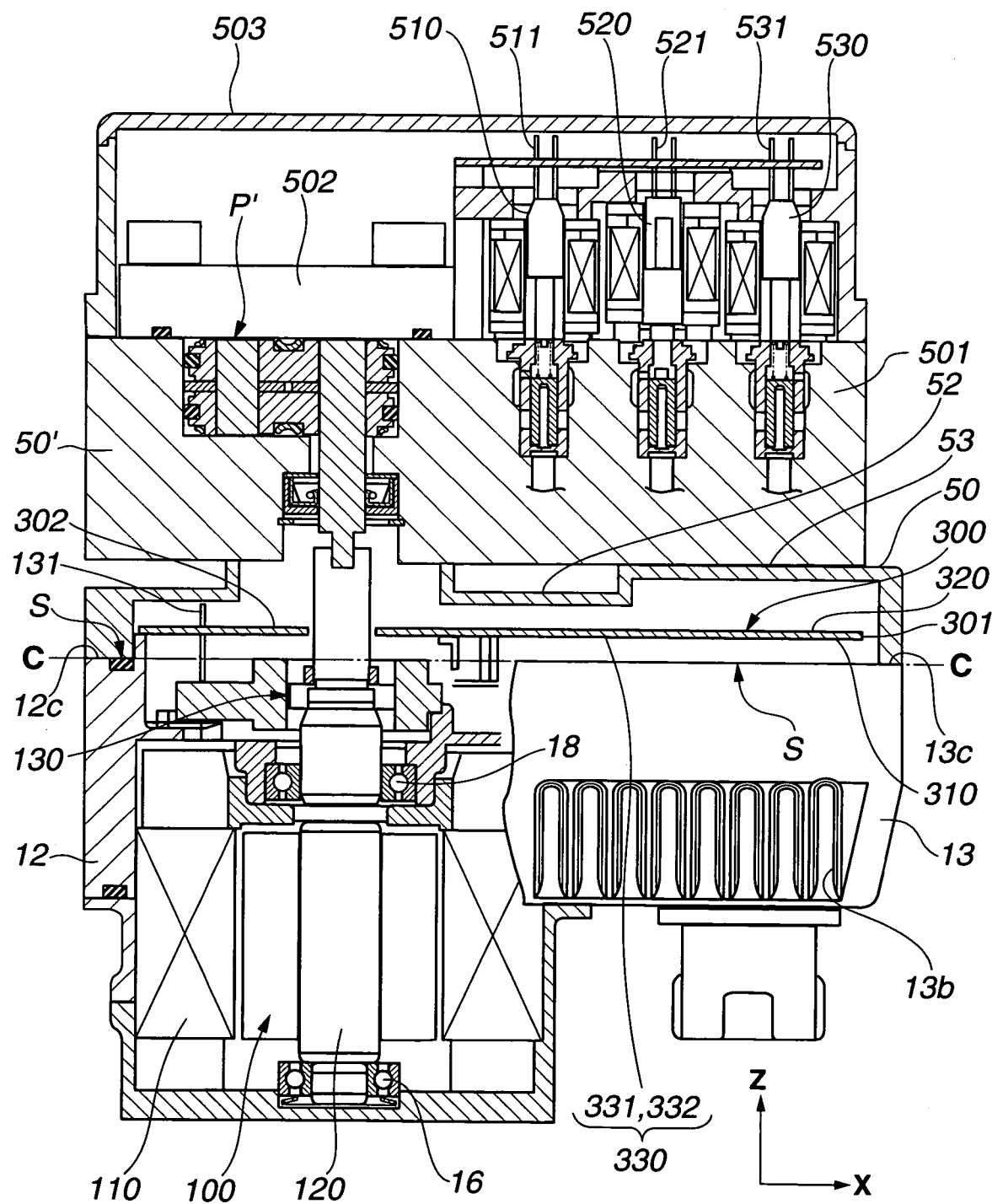
FIG. 20 is a sectional view of a brake control unit housing of a brake control system according to a fourth practical example of the third embodiment.

FIG. 20 shows a fourth practical example according to the third embodiment. The fourth practical example employs the first and second control system boards 300 and 300b as in the third practical example, and further employs a pump cover 502. Pump cover 502 is enclosed in cover 503, and fixed to the unit housing 501 so that pump P' is enclosed liquid-tightly. In the fourth practical example of FIG. 20, there is provided, between cover 50' and the housing composed of motor housing 12 and power system board housing 13, a cover 50 similar to the cover 50 shown in FIG. 13.

Figure 21:
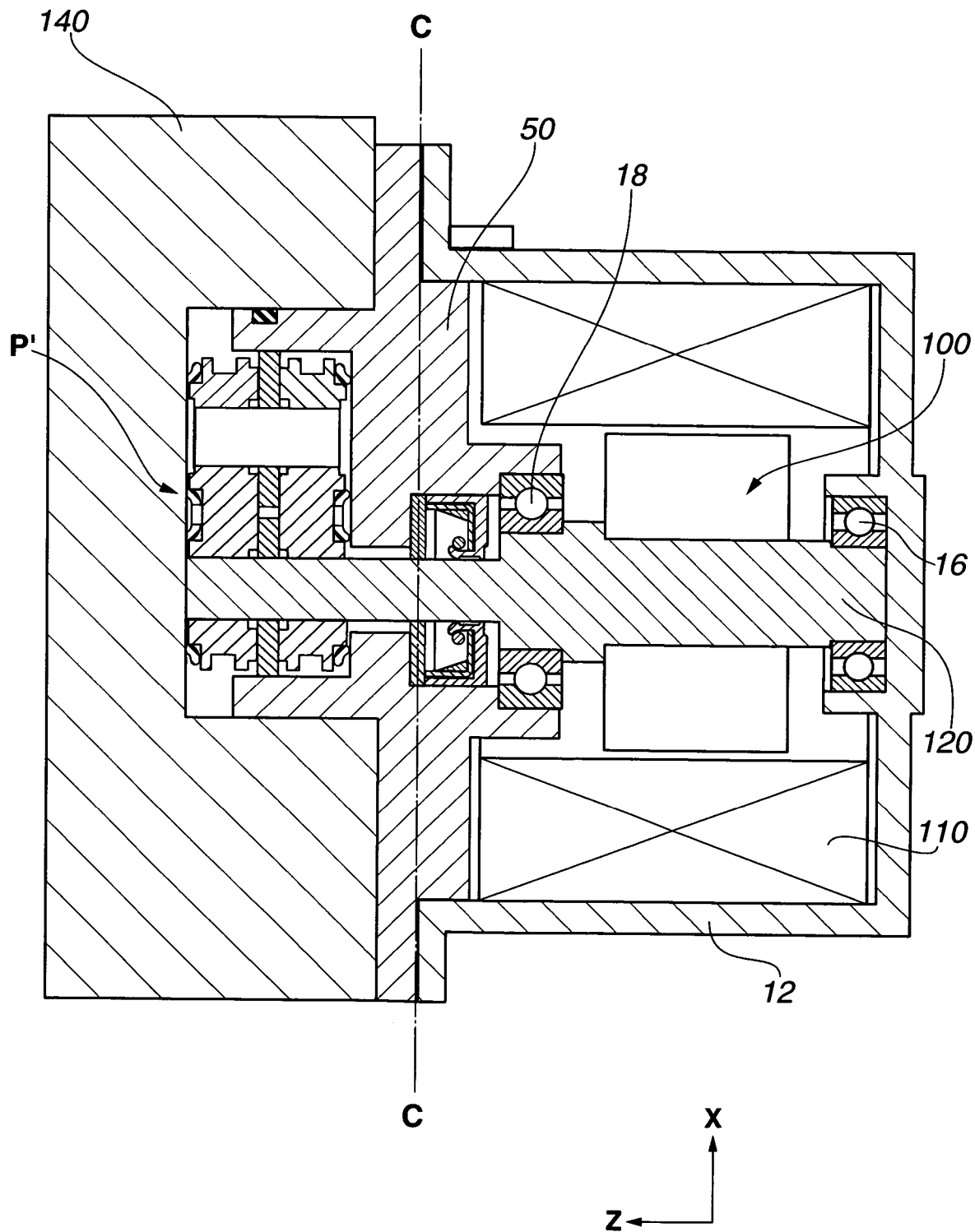
FIG. 21 is a sectional view of a brake control unit housing of a brake control system according to a fifth practical example of the third embodiment.

FIG. 21 shows a fifth practical example according to the third embodiment. The fifth practical example employs a motor front cover 140 which serves both as a pump cover and a motor cover for motor 100. These second through fifth practical examples can provide the same effects as in the first practical example of the third embodiment. In the third embodiment, the solenoid valves can be mounted on the control system board.

This application is based on a prior Japanese Patent Application No. 2004-336806 filed on Nov. 22, 2004, and a prior Japanese Patent Application No. 2005-260111 filed on Sep. 8, 2005. The entire contents of Japanese Patent Application No. 2004-336806 and Japanese Patent Application No. 2005-260111 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A motor control apparatus comprising:
 a motor including a rotating member;
 a control system board supporting a component of a control circuit to control the motor, and including a first board portion facing in a direction along a rotation axis of the motor, and a second board portion extending radially from the first board portion;
 a housing member enclosing the motor;
 a rotation sensor which is arranged to sense a rotational position of the rotating member of the motor, and which is mounted on the housing member;
 an actuating section connected with the motor to receive torque from the motor; and
 a power system board supporting a component of a power supply circuit to supply power to the motor, the power system board being located on the same side of the control system board as the motor being located, and the power system board being located radially outside of the motor.

2. The motor control apparatus as claimed in claim 1, wherein the first board portion of the control system board is oriented so that the rotation axis of the rotating member of the motor is substantially perpendicular to the first board portion.

3. The motor control apparatus as claimed in claim 1, wherein the motor comprises a stator extending axially from a first axial end to a second axial end, and the first board portion of the control system board confronts the second axial end of the stator axially.

4. The motor control apparatus as claimed in claim 1, wherein the motor control apparatus comprises a housing member enclosing the motor and extending axially from a first end to a second end, and the control system board confronts the second end of the housing member axially.

5. The motor control apparatus as claimed in claim 4, wherein the housing member enclosing the motor includes a circumferential wall surrounding the motor and an annular end wall which defines the second end of the housing member and which is formed with a hole; the rotating member of the motor includes an output shaft extending through the hole of the annular end wall of the housing member; the first board portion of the control system board confronts the annular end wall of the housing member axially; and the second board portion of the control system board extends radially outwards.

6. The motor control apparatus as claimed in claim 5, wherein the motor control apparatus comprises a bearing supporting the output shaft of the motor, and the bearing is mounted on the housing member.

7. The motor control apparatus as claimed in claim 6, wherein the housing member comprises an annular end wall which includes a hole through which the output shaft of the motor extends, a sensor mounting portion to which the rotation sensor is fixed, and a portion supporting the bearing.

8. The motor control apparatus as claimed in claim 1, wherein the first board portion of the control system board is formed with a through hole, and the rotating member of the motor includes an output shaft extending through the through hole of the first board portion of the control system board.

9. The motor control apparatus as claimed in claim 8, wherein the power supply connector projects, from a base end, in the first axial direction through a housing member enclosing the power system board, and through the through portion of the power system board, to the control system board.

10. The motor control apparatus as claimed in claim 1, wherein the control circuit comprises a first side circuit section mounted on a first side of the control system board and a second side circuit section mounted on a second side of the control system board.

11. The motor control apparatus as claimed in claim 1, wherein the control circuit comprises a microcomputer mounted on the control system board.

12. The motor control apparatus as claimed in claim 1, wherein the first and second board portions of the control system board are flat and continuous with each other.

13. The motor control apparatus as claimed in claim 1, wherein the control circuit is configured to control the power supply circuit.

14. The motor control apparatus as claimed in claim 1, wherein the power system board extends radially along the second board portion of the control system board.

15. The motor control apparatus as claimed in claim 14, wherein the power system board and the control system board are adjacent to each other.

16. The motor control apparatus as claimed in claim 15, wherein the power supply circuit and the control circuit are electrically connected by connecting pins each of which includes a first pin end supported by the power system board and a second pin end supported by the second board portion of the control system board.

17. The motor control apparatus as claimed in claim 14, wherein the rotating member of the motor includes an output shaft projecting axially in a first axial direction; and the power system board includes a surface facing in the first axial direction toward the second board portion of the control system board; and the second board portion of the control system board includes a surface which faces in a second axial direction opposite to the first axial direction toward the power system board.

18. The motor control apparatus as claimed in claim 14, wherein the power system board supports a plurality of the components of the power supply circuit; and the motor control apparatus comprises a housing member formed with receiving portions, respectively, fitting over the components of the power supply circuit and thereby positioning the circuit components independently.

19. The motor control apparatus as claimed in claim 14, wherein the power system board is formed with a through portion receiving a power supply connector extending from an outside through the power system board toward the control system board.

20. The motor control apparatus as claimed in claim 14, wherein the power system board supports at least one of a relay, a capacitor and a coil.

21. The motor control apparatus as claimed in claim 14, wherein the motor control apparatus comprises a housing member which encloses the power system board, and which includes a first housing portion in which a heat sink is provided, and a second housing portion; and the component of the power supply circuit mounted on the power system board is a switching device having a wall surface held in contact with a wall surface of the second housing portion of the housing member.

22. The motor control apparatus as claimed in claim 21, wherein the housing member enclosing the power system board is made of a heat conductive material.

23. The motor control apparatus as claimed in claim 22, wherein the housing member enclosing the power system board is made of aluminum alloy.

24. The motor control apparatus as claimed in claim 21, wherein the second housing portion faces the power system board; and wherein the switching device is an inverter.

25. The motor control apparatus as claimed in claim 21, wherein the wall surface of the second housing portion is substantially flat and parallel to the power system board, and the wall surface of the switching device is substantially flat and in contact with the wall surface of the second housing portion.

26. The motor control apparatus as claimed in claim 14, wherein the motor control apparatus comprises a housing including a first portion enclosing the motor and a second portion enclosing the power system board, and the first and second portions of the housing are integral with each other.

27. The motor control apparatus as claimed in claim 26, wherein the first and second portions of the housing includes respective end surfaces which form a continuous flat joint surface to which a second housing covering the control system board is joined.

28. The motor control apparatus as claimed in claim 14, wherein the motor control apparatus comprises a power system housing member which encloses the power system board, and which is an aluminum die-casting.

29. The motor control apparatus as claimed in claim 14, wherein the power system board includes a main flat portion which is substantially parallel to the second board portion of the control system board.

30. The motor control apparatus as claimed in claim 1, wherein the rotation sensor is located adjacent to the control system board.

31. The motor control apparatus as claimed in claim 30, wherein the rotation sensor includes a terminal projecting along the rotation axis of the motor which is substantially perpendicular to the control system board.

32. The motor control apparatus as claimed in claim 30, wherein the rotation sensor is placed axially between the motor and the control system board.

33. The motor control apparatus as claimed in claim 30, wherein the motor control apparatus comprises a housing member including an annular end wall having a hole, the rotating member of the motor includes an output shaft extending through the hole of the annular end wall of the housing member; and the rotation sensor is mounted on the annular end wall of the housing member and located axially between the annular end wall of the housing member and the control system board.

34. The motor control apparatus as claimed in claim 30, wherein the first board portion of the control system board is formed with a through hole which receives the rotating member of the motor, and which is reduced in opening size as compared to an opening of the rotation sensor.

35. The motor control apparatus as claimed in claim 1, wherein the motor control apparatus comprises an actuating section connected with the motor to receive torque from the motor.

36. The motor control apparatus as claimed in claim 35, wherein the actuating section includes a driven member driven by the motor; and the control system board is placed between the motor and the driven member of the actuating section.

37. The motor control apparatus as claimed in claim 36, wherein the driven member of the actuating section is aligned with the motor so that a rotation axis of the driven member is substantially collinear with the rotation axis of the motor.

38. The motor control apparatus as claimed in claim 37, wherein the motor control apparatus comprises a housing enclosing the motor, and a cover member extending between the housing and the driven member and covering an opening of the housing; and wherein the control system board is placed between the housing and the cover member.

39. The motor control apparatus as claimed in claim 38, wherein the actuating section includes a case supporting the driven member rotatably, and including a fitting portion; and the cover member includes a fitting portion engaging with the fitting portion of the case of the actuating section, to align the motor and the driven member.

40. The motor control apparatus as claimed in claim 36, wherein the motor control apparatus is a power steering system; the actuating section includes a steering mechanism and a torque sensor to sense a steering torque; and the control circuit is configured to control the motor in accordance with the steering torque.

41. The motor control apparatus as claimed in claim 36, wherein the motor control apparatus is an electric power steering system and the actuating section includes a steering gear mechanism.

42. The motor control apparatus as claimed in claim 41, wherein the steering gear mechanism comprises a worm wheel connected with a steering shaft and a worm shaft which is the driven member driven by the motor and which is engaged with the worm wheel.

43. The motor control apparatus as claimed in claim 42, wherein the worm shaft is rotatably supported at both ends of the worm shaft by first and second bearings; wherein the worm shaft is aligned with the rotating member of the motor; and wherein the rotating member of the motor is supported at both ends by third and fourth bearings.

44. The motor control apparatus as claimed in claim 42, wherein the control system board is placed between the motor and the worm wheel.

45. The motor control apparatus as claimed in claim 36, wherein the actuating section is a hydraulic system, and the actuating section includes a hydraulic pump driven by the motor to produce a hydraulic pressure.

46. The motor control apparatus as claimed in claim 45, wherein the actuating section includes a fluid reservoir disposed above the pump.

47. The motor control apparatus as claimed in claim 46, wherein the pump is positioned vertically between the motor below the pump and the fluid reservoir above the pump.

48. The motor control apparatus as claimed in claim 45, wherein the first board portion of the control system board is placed between the motor and the pump and formed with a through hole through which the motor and the pump is drivingly connected.

49. The motor control apparatus as claimed in claim 45, wherein the motor control apparatus comprises a cover covering the control system board.

50. The motor control apparatus as claimed in claim 49, wherein the cover includes a pump side portion which is located between the pump and the first board portion of the control system board, and an outer portion which extends radially outwards beyond the pump, and which is higher than the pump side portion.

51. The motor control apparatus as claimed in claim 45, wherein the motor control apparatus is a hydraulic power steering system and the actuating section further includes a hydraulic steering power cylinder operated by the hydraulic pressure produced by the pump.

52. The motor control apparatus as claimed in claim 45, wherein the motor control apparatus is a brake control system and the actuating section includes a hydraulic brake section operated by the hydraulic pressure produced by the pump.

53. The motor control apparatus as claimed in claim 52, wherein the actuating section includes a solenoid valve to regulate the hydraulic pressure produced by the pump.

54. The motor control apparatus as claimed in claim 53, wherein the solenoid valve includes a terminal projecting toward the control system board.

55. The motor control apparatus as claimed in claim 54, wherein the terminal of the solenoid valve is connected with the control system board.

56. The motor control apparatus as claimed in claim 53, wherein the control system board is a first control system board, and the motor control apparatus further comprises a second control system board, and the terminal of the solenoid valve is connected with the second control system board.

57. The motor control apparatus as claimed in claim 1, wherein a rotation sensor is directly mounted on the housing member.

58. A motor control apparatus comprising:
a motor including a rotating member;
a control system board supporting a component of a control circuit to control the motor, and including a first board portion facing in a direction along a rotation axis of the motor, and a second board portion extending radially from the first board portion;
a housing member enclosing the motor; and
a rotation sensor which is arranged to sense a rotational position of the rotating member of the motor, and which is mounted on the housing member;
wherein the motor control apparatus comprises an actuating section connected with the motor to receive torque from the motor, and a power system board supporting a component of a power supply circuit to supply power to the motor; the control system board is located between the actuating section lying on a first side of the control system board and the motor lying on a second of the control system board, and the power system board and the rotation sensor are located side by side on the second side of the control system board opposite to the first side.

59. The motor control apparatus as claimed in claim 58, wherein the power system board confronts the second board portion of the control system board whereas the rotation sensor confronts the first board portion of the control system board.

* * * * *